US011983170B2

(12) United States Patent
Mylavarapu et al.

(10) Patent No.: US 11,983,170 B2
(45) Date of Patent: May 14, 2024

(54) SYSTEM AND METHOD FOR TRANSACTION CONTINUITY ACROSS FAILURES IN A SCALE-OUT DATABASE

(71) Applicant: Oracle International Corporation, Redwood Shores, CA (US)

(72) Inventors: Ajit Mylavarapu, Mountain View, CA (US); Vasudha Krishnaswamy, Fremont, CA (US); Sukhada Pendse, Foster City, CA (US); Solmaz Kolahi, Redwood City, CA (US); Ankita Kumar, Belleuvue, WA (US); Garret F. Swart, Palo Alto, CA (US); Tirthankar Lahiri, Palo Alto, CA (US); Juan R. Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/117,810

(22) Filed: Mar. 6, 2023

(65) Prior Publication Data

US 2023/0281190 A1    Sep. 7, 2023

Related U.S. Application Data

(63) Continuation of application No. 17/137,745, filed on Dec. 30, 2020, now Pat. No. 11,599,421, which is a
(Continued)

(51) Int. Cl.
*G06F 16/23* (2019.01)
*G06F 16/28* (2019.01)

(52) U.S. Cl.
CPC ........ *G06F 16/2379* (2019.01); *G06F 16/285* (2019.01)

(58) Field of Classification Search
CPC ... G06F 16/2379; G06F 16/285; G06F 16/278
(Continued)

(56) References Cited

U.S. PATENT DOCUMENTS

2006/0036655 A1    2/2006  Lastovica
2010/0036810 A1    2/2010  Wu et al.
(Continued)

FOREIGN PATENT DOCUMENTS

EP           0567999        4/1993
WO    WO-2020160557 A1 *  8/2020  ............ G06F 11/181

OTHER PUBLICATIONS

Unknown Author, "Commitment Protocols on Shared Databases", https://web.archive.org/web/20200215062044if_, dated Feb. 2020, 8 pages.
(Continued)

*Primary Examiner* — Michael Pham
(74) *Attorney, Agent, or Firm* — Hickman Becker Bingham Ledesma LLP

(57) ABSTRACT

One or more engine instances are executed on each host to form an engine cluster. A plurality of control instances are executed on a first set of hosts to form a control cluster and comprise a control instance leader and one or more control instance followers. In response to a first host indicating a failure of a neighbor host, a pair-wise focused investigation is initiated to check peer-to-peer connections between the first host and the neighbor host. In response to one or more additional hosts indicating failures of neighbor hosts while the pair-wise focused investigation is being performed, a wide investigation is performed to check connections between the control cluster and the plurality of hosts. One or
(Continued)

more hosts are added to an eviction list and an eviction protocol is performed to evict the one or more hosts from the engine cluster using the eviction list.

20 Claims, 16 Drawing Sheets

Related U.S. Application Data continuation-in-part of application No. 17/070,277, filed on Oct. 14, 2020, now Pat. No. 11,550,771.

(58) Field of Classification Search
USPC .......................................................... 707/705
See application file for complete search history.

(56) References Cited

U.S. PATENT DOCUMENTS

| | | |
|---|---|---|
| 2019/0179918 A1 | 6/2019 | Singh |
| 2020/0142900 A1 | 5/2020 | Li et al. |
| 2022/0114058 A1 | 4/2022 | Mylavarapu et al. |
| 2022/0114153 A1 | 4/2022 | Kamp et al. |
| 2022/0114164 A1 | 4/2022 | Krishnaswamy et al. |
| 2022/0114192 A1 | 4/2022 | Bridge, Jr. et al. |

OTHER PUBLICATIONS

Oracle, "Oracle Enterprise Manager Cloud Control Introduction", 13c, Release 4, https://web.archive.org/web/2020091614 2459if_/ https://docs.oracle.com, dated Sep. 16, 2020, 38 pages.

Oracle, "Oracle Database 19c: Oracle Autonomous Health Framework", https://www.oracle.com/technetwork/dat abase/options/clustering/overview/oracle-a hf-4392556.pdf, dated Apr. 1, 2019, 38 pages.

Oracle Enterprise Manager, "Cloud Control Administrator's Guide", 13C, Release 2, https://oraclefiles.com/wp-content/uploads/2019/03/OEM_01_PDF_132_AdminGuide.pdf, dated Oct. 2017, 59 pages.

Ongaro et al., "In Search of an Understandable Consensus Algorithm (Extended Version)", URL:https://raft.github.io/raft.pdf, dated May 20, 2014, 18 pages.

Choudhury, Tanmay, "Oracle Database SQLJ Developer's Guide Release 19c", https://docs.oracle.com/cd/F19136_01/j sqlj/sqlj-developers-guide.pdf, dated Jan. 1, 2019, 48 pages.

Bhatiya et al., "Oracle Database: Database Administrator's Guide", https://docs.oracle.com/en/database/oracle/oracle-database/12.2/admin/database-administrators-guide.pdf, dated May 1, 2020, 18 pages.

Beecher, et al., "Oracle Database Using Oracle Sharding, 18c", https://web.archive.org/web/20190727114910if_/https://docs.oracle.com/en/databas e/oracle/oracle-database/18/shard/using-or acle-sharding.pdf, dated Jul. 27, 2019, 230 pages.

Anonymous: "Oracle Active Data Guard Real-Time Data Protection and Availability", https://www.oracle.com/technetwork/database/availability/active-data-guard-wp-12c-1896127.pdf, dated Oct. 1, 2015, 22 pages.

Anonymous, "Understanding Transaction Processing", https://web.archive.org/web/20160827044538/https://docs.oracle.com/cd/E17984_01/doc.898/e14694/transaction_processing.htm, dated Aug. 27, 2016, 6 pages.

Anonymous, "Database Administrator's Guide: Distributed Transactions Concepts", https://web.archive.org/web/ 20200919201254/ https://docs.oracle.com/en/database/o racle/oracle-database/12.2/admin/distribut ed-transactions-concepts.htm, Sep. 19, 2020, 24 pgs.

* cited by examiner

| OTHER METADATA 814 | TXN INFO 806 | PRE ROW REF 808 | #COLS 810 | DATA COLUMNS 812 |

SYSTEM AND METHOD FOR TRANSACTION CONTINUITY ACROSS FAILURES IN A SCALE-OUT DATABASE

CROSS-REFERENCE TO RELATED APPLICATIONS, BENEFIT CLAIM

This application claims the benefit as a Continuation of application Ser. No. 17/137,745, filed Dec. 30, 2020, which is a Continuation-in-Part of application Ser. No. 17/070,277, filed Oct. 14, 2020, and the entire contents of application Ser. No. 17/137,745 and application Ser. No. 17/070,277 are hereby incorporated by reference as if fully set forth herein, under 35 U.S.C. § 120. The applicant hereby rescind any disclaimer of claim scope in the parent application or the prosecution history thereof and advise the USPTO that the claims in this application may be broader than any claim in the parent applications.

FIELD OF THE INVENTION

The present invention relates to storage systems and, more specifically, to shared-nothing database systems.

BACKGROUND

Databases that run on multi-processing systems typically fall into two categories: shared-persistent-storage databases and shared-nothing databases. A shared-persistent-storage database expects all persistent storage devices in the computer system to be visible to all processing nodes. Consequently, a coordinator process in a shared-persistent-storage database system may assign any work granule to a process on any node, regardless of the location of the persistent storage that contains the data that will be accessed during execution of the work granule. Shared-persistent-storage databases may be run on both shared-nothing and shared-persistent-storage computer systems. To run a shared-persistent-storage database on a shared-nothing computer system, software support may be added to the operating system or additional hardware may be provided to allow processes to have direct access to remote persistent storage devices.

A shared-nothing database assumes that a process can access data only if the data is contained on a persistent storage that belongs to the same node as the process. Consequently, a coordinator process in a shared-nothing database can only assign a work granule to a process if the data to be processed in the work granule resides on persistent storage in the same node as the process. Shared-nothing databases may be run on both shared-persistent-storage and shared-nothing multi-processing systems. To run a shared-nothing database on a shared-persistent-storage machine, a mechanism may be provided for logically partitioning the database, and assigning ownership of each partition to a particular node.

Based on the foregoing, it is clearly desirable to provide a shared-nothing database system that has less constraints with respect to which node of the shared-nothing database system is able to process work. For example, when the task is reading a particular version of a particular data item that is stored in the database system, it is desirable to provide a shared-nothing database system in which multiple nodes are capable of performing the task. The larger the number of nodes that are able to perform the same task, the easier it is for workloads to be balanced among the available nodes. In addition, it is desirable that a node that is performing a read operation be able to read the data as of a designated snapshot time. To further improve performance, it is desirable that the read operations be performed without obtaining locks, and without blocking even when reading data items that were touched by transactions that have not yet committed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 8 is a block diagram that illustrates the contents of a row heap entry, according to an embodiment;

DETAILED DESCRIPTION

Figure 1:
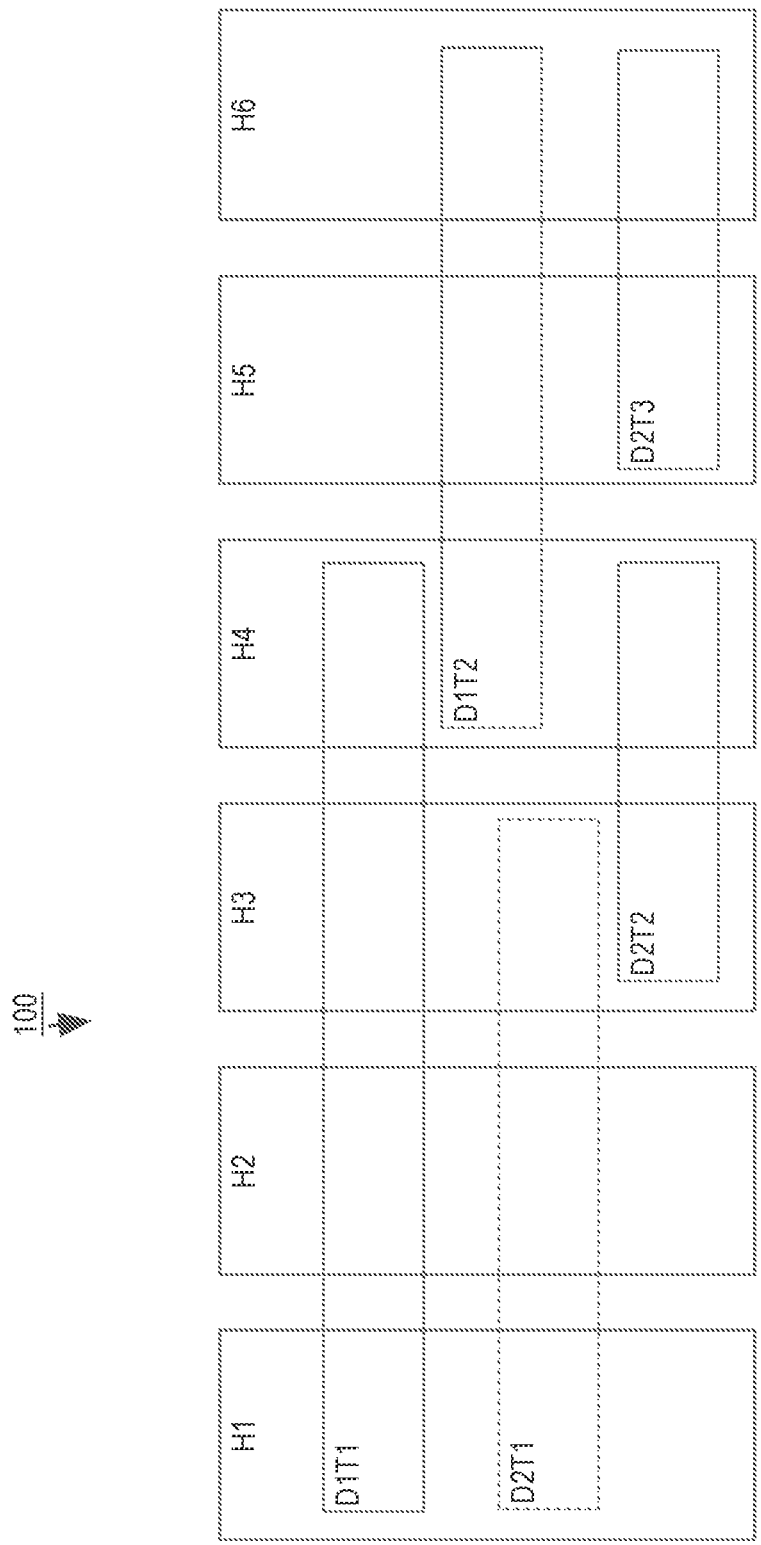
FIG. 1 is a block diagram of a distributed database system that illustrates the relationship between hosts, databases, and tablespaces, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A shared-nothing database system is provided in which parallelism and workload balancing are increased by assigning the rows of each table to "slices", and storing multiple copies ("duplicas") of each slice across the persistent storage of multiple nodes of the shared-nothing database system. When the data for a table is distributed among the nodes of a shared-nothing system in this manner, requests to read data from a particular row of the table may be handled by any node that stores a duplica of the slice to which the row is assigned.

According to an embodiment, for each slice, a single duplica of the slice is designated as the "primary duplica". All DML operations (e.g. inserts, deletes, updates, etc.) that target a particular row of the table are performed by the node that has the primary duplica of the slice to which the particular row is assigned. The changes made by the DML operations are then propagated from the primary duplica to the other duplicas ("secondary duplicas") of the same slice.

Slices

As mentioned above, a "slice" is an entity to which rows of a table are assigned. The assignment of rows to slices may be made in a variety of ways, and the techniques described herein are not limited to any particular row-to-slice assignment technique. For example, the table may have a primary key, and each slice may be assigned the rows whose primary keys fall into a particular range. In such an embodiment, a table whose primary key is alphabetic may have its rows assigned to three slices, where the first slice includes rows whose primary key starts with letters in the range A-K, the second slice includes rows whose primary key starts with letters in the range L-T, and the third slice includes rows whose primary key starts with letters in the range U-Z.

As another example, the row-to-slice assignment may be made using a hash function. For example, a hash function that produces hash values in the range 1-3 may be used to assign rows to three slices. The slice to which any given row is assigned is determined by the hash value produced when the hash function is applied to the row's primary key.

For any given table, the number of slices to which its rows are assigned may vary based on a variety of factors. According to one embodiment, the number of slices is selected such that no single slice will store more than 1 gigabyte of data. Thus, as a general rule, the more data contained in a table, the greater the number of slices to which the rows of the table are assigned.

In situations where a table has no designated primary key column, the database system creates and populates a column with values that may serve as the primary key for the purpose of assigning the rows of the table to slices. The values for such a system-created primary key column may be, for example, an integer value that increases for each new row. This is merely an example of how system-generated primary key values can be created, and the techniques described herein are not limited to any particular method of generating primary key values.

Duplicas

A "duplica" is a stored copy of a slice. According to one embodiment, every slice has at least two duplicas. As mentioned above, each slice has one duplica that is designated as the primary duplica of the slice, and one or more secondary duplicas. Requests to read data from a slice may be performed by any node whose persistent storage has a duplica of the slice. However, requests to perform DML operations (e.g. insert, delete, update) on a slice are only performed by the node whose persistent storage has the primary duplica of the slice.

Hosts

As used herein, the term "host" refers to the hardware components that constitute a shared-nothing node. For example, a host may be a computer system having one or more processors, local volatile memory, and local persistent storage. The volatile memory and persistent storage of a host are "local" in that I/O commands issued by the host to the volatile memory and persistent storage do not travel over inter-host network connections. As shall be described in greater detail hereafter, one host may interact directly over inter-host network connections with the volatile memory or persistent storage of another host through the use of Remote Direct Memory Access (RDMA) operations.

Persistent Storage

As mentioned above, each host has local persistent storage on which the duplicas that are hosted by the host are stored. The persistent storage may take a variety of forms, including but not limited to magnetic disk storage, NVRAM, NVDIMM, and FLASH/NVMe storage. In addition, the persistent storage may include a combination of storage technologies, such as NVRAM and magnetic disk storage, or NVRAM and FLASH/NVMe. For the purpose of explanation, it shall be assumed that the persistent storage used by the hosts is NVRAM. However, the techniques described herein are not limited to any persistent storage technology.

Engine Instances

As used herein, the term "engine instance" refers to the code, executing within a host, for storing, manipulating and retrieving data that is stored in duplicas on the persistent storage that is local to the host. A single host may execute any number of engine instances. An "engine cluster", also referred to herein as a "database system", includes one or more engine instances that work together to service database commands from clients. Engine clusters are described in greater detail hereafter.

In one embodiment, each host executes a distinct engine instance for each database whose data the host is hosting. For example, if a host H1 is hosting duplicas for a table in database D1 and duplicas for a table in database D2, host H1 would execute one engine instance for accessing the duplicas that belong to database D1, and a second engine instance for accessing the duplicas that belong to database D2.

For the purpose of explanation, examples shall be given hereafter involving a single database, where each host is executing a single engine instance. However, the techniques described herein are not limited to such an embodiment.

Databases and Tablespaces

A database typically includes a set of tables and corresponding support structures, such as indexes. Databases include one of more tablespaces. According to an embodiment, each tablespace is assigned to one or more hosts. The host(s) to which a tablespace is assigned store the duplicas for the tables that reside in the tablespace.

For example, FIG. 1 is a block diagram that illustrates a database system 100 that includes six hosts H1, H2, H3, H4, H5 and H6. In the illustrated example, the database system 100 manages two databases D1 and D2. Database D1 has two tablespaces D1T1 and D1T2, and database D2 has three tablespaces D2T1, D2T2 and D2T3.

Tablespace D1T1 is assigned to hosts H1, H2, H3 and H4. Thus, the "footprint" of tablespace D1T1 spans hosts H1-H4, and each of hosts H1, H2, H3 and H4 host a "tablespace member" of tablespace D1T1. Similarly, tablespace D1T2 is assigned to hosts H4, H5 and H6. Consequently, hosts H4, H5 and H6 each host a tablespace member of D1T2.

Tablespace D2T1 is assigned to hosts H1, H2 and H3. This illustrates that a single host may host tablespace members from multiple databases (e.g. H1 hosts a tablespace member of D1T1 from database D1, and a tablespace member of D2T1 from database D2). Tablespace D2T2 is assigned to hosts H3 and H4. Tablespace D2T3 is assigned to hosts H5 and H6.

Based on these assignments, the duplicas for a table that belongs to D2T2 would, for example, be stored in the persistent storages of hosts H3 and H4. Similarly, the duplicas for a table that belongs to tablespace D1T2 would be stored in the persistent storages of hosts H4, H5 and H6.

In some embodiments, databases may be hosted on a subset of the available hosts. For example, database D1 may be hosted on hosts H1-H4. The hosts of the tablespaces of the database are limited to the hosts of the database. Thus, if database D1 is limited to hosts H1-H4, then tablespaces D1T1 and D1T2 would only be hosted on hosts H1-H4. Under these circumstances, duplicas for tables that reside in tablespace D1T2 could not be hosted on H5 or H6, as illustrated in FIG. 1.

Example Database System

Figure 2:
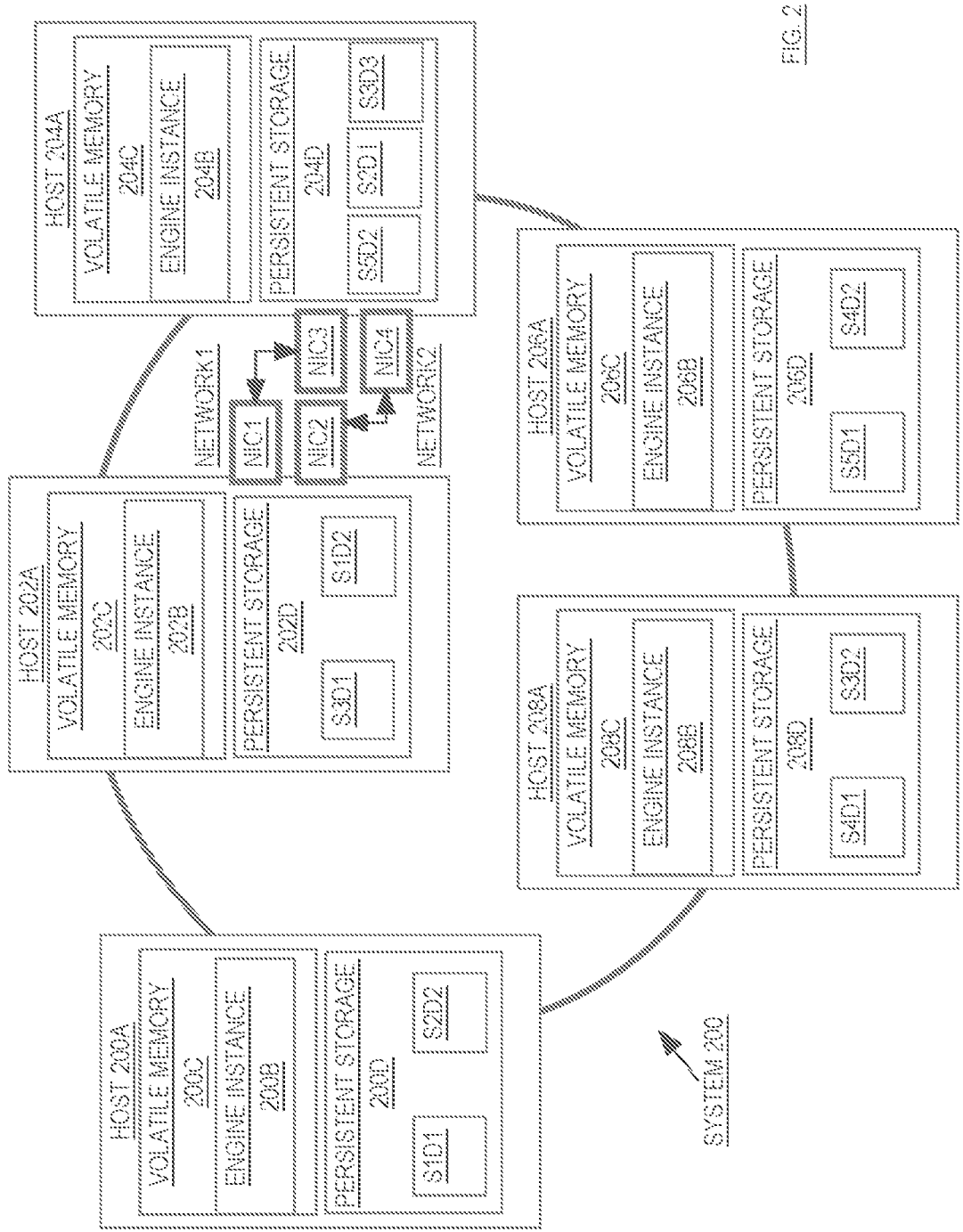
FIG. 2 is a block diagram of a distributed database system in which the rows of a table are mapped to slices, and multiple duplicas are stored for each slice, according to an embodiment.

Referring to FIG. 2, it is a block diagram of a database system 200 comprising a cluster of engine instances. The database system 200 illustrated in FIG. 2 includes five hosts (200A, 202A, 204A, 206A, 208A). Each host includes local volatile memory (200C, 202C, 204C, 206C, 208C) and local persistent storage (200D, 202D, 204D, 206D, 208D). Each host is executing an engine instance (200B, 202B, 204B, 206B, 208B).

Engine instances 200B, 202B, 204B, 206B, 208B manage access to duplicas that store data for a database that is managed by the database system 200. In the illustrated embodiment, the database includes a single table T whose rows have been mapped to five slices (S1, S2, S3, S4 and S5). The database stores two duplicas for slices S1, S2, S4 and S5, and three duplicas for slice S3. Specifically, the primary duplica for slice S1 (S1D1) is hosted at host 200A. The secondary duplica for slice S1 (S1D2) is hosted at host 202A. The primary duplica for slice S2 (S2D1) is hosted at host 204A. The secondary duplica for slice S2 (S2D2) is hosted at host 200A. The primary duplica for slice S3 (S3D1) is hosted at host 202A. The secondary duplicas for slice S3 (S3D2 and S3D3) are hosted at hosts 208A and 204A, respectively. The primary duplica for slice S4 (S4D1) is hosted at host 208A. The secondary duplica for slice S4 (S4D2) is hosted at host 206A. The primary duplica for slice S5 (S5D1) is hosted at host 206A. The secondary duplica for slice S5 (S5D2) is hosted at host 204A.

Because each of hosts 200A-208A operates as a shared-nothing node, the engine instances on the hosts only have direct access to the duplicas that are in their local persistent storage. As mentioned above, operations to read data from a slice can be performed by any engine instance that is local to any duplica of the slice. Thus, a request to read data from slice S2 may be directed to engine instance 200B (which has access to a secondary duplica of S2) or to engine instance 204B (which has access to the primary duplica of S2). However, DML operations are performed only on the primary duplica of a slice. Thus, any DML operations that operate on data in slice S2 must be directed to engine instance 204B, because only engine instance 204B has access to the primary duplica of slice S2.

The Slice-to-Engine-Instance Map

According to an embodiment, to ensure that database requests are directed to the appropriate engine instances, each host maintains a slice-to-engine-instance map that indicates the duplicas that are being hosted by each engine instance. For example, the slice-to-engine-instance map for the system 200 illustrated in FIG. 2 may contain the following information:

| SLICE | S1 | S2 | S3 | S4 | S5 |
|---|---|---|---|---|---|
| PRIMARY | EI 200B on HOST 200A | EI 204B on HOST 204A | EI 202B on HOST 202A | EI 208B on HOST 208A | EI 206B on HOST 206A |
| SECONDARY | EI 202B on HOST 202A | EI 200B on HOST 200A | EI 208B on HOST 208A | EI 206B on HOST 206A | EI 204B on HOST 204A |
| SECONDARY | | | EI 204B on HOST 204A | | |

The slice-to-engine-instance map is used in conjunction with a row-to-slice map in order to identify the host to which any given request should be directed. For example, in response to a request to insert a new row into table T, the engine instance receiving the request determines the primary key of the new row and uses the row-to-slice map to determine the slice of table T to which the new row belongs. For the purpose of explanation, it shall be assumed that the new row belongs to slice S2. The host then inspects the slice-to-engine-instance map to determine that the primary duplica of slice S2 is hosted at host 204A. If the engine instance that received the request is engine instance 204B, then engine instance 204B performs the insert into primary duplica S2D1. If the engine instance that received the request is not engine instance 204B, then the engine instance that received the request ships the request to engine instance 204B. The process of selecting the appropriate engine instance to coordinate execution of any given database request shall be described in greater detail hereafter.

In the example given above, the requested operation is a DML, operation (insert). Consequently, only the engine instance that controls the primary duplica of the slice in question can perform the operation. However, if the operation were simply to read data from slice S2, then the operation could be performed either by engine instance 204B (which has the primary duplica of S2) or engine instance 200B (which has a secondary duplica of S2).

The Content of a Duplica

As mentioned above, a duplica stores those rows, of a table, that have been mapped to the slice represented by the duplica. For example, assume that slice S1 is a slice of a table T1 whose primary key is social security number (SSN). Assume further that all rows of table T1 whose primary keys fall into the range 000-00-0000 to 399-99-9999 are mapped to slice S1. Under these circumstances, each duplica of S1 would store all rows of table T1 whose primary keys fall into the range 000-00-0000 to 399-99-9999.

In the system illustrated in FIG. 2, the duplicas for slice S1 reside on host 200A (which has primary duplica S1D1) and on host 202A (which has secondary duplica S1D2). Thus, both duplicas S1D1 and S1D1 would store all rows of table T1 whose primary keys fall into the range 000-00-0000 to 399-99-9999. However, according to one embodiment, to support snapshot-based retrieval of data, duplicas store more than the current version of the rows that are mapped to the slice represented by the duplica.

Figure 3:
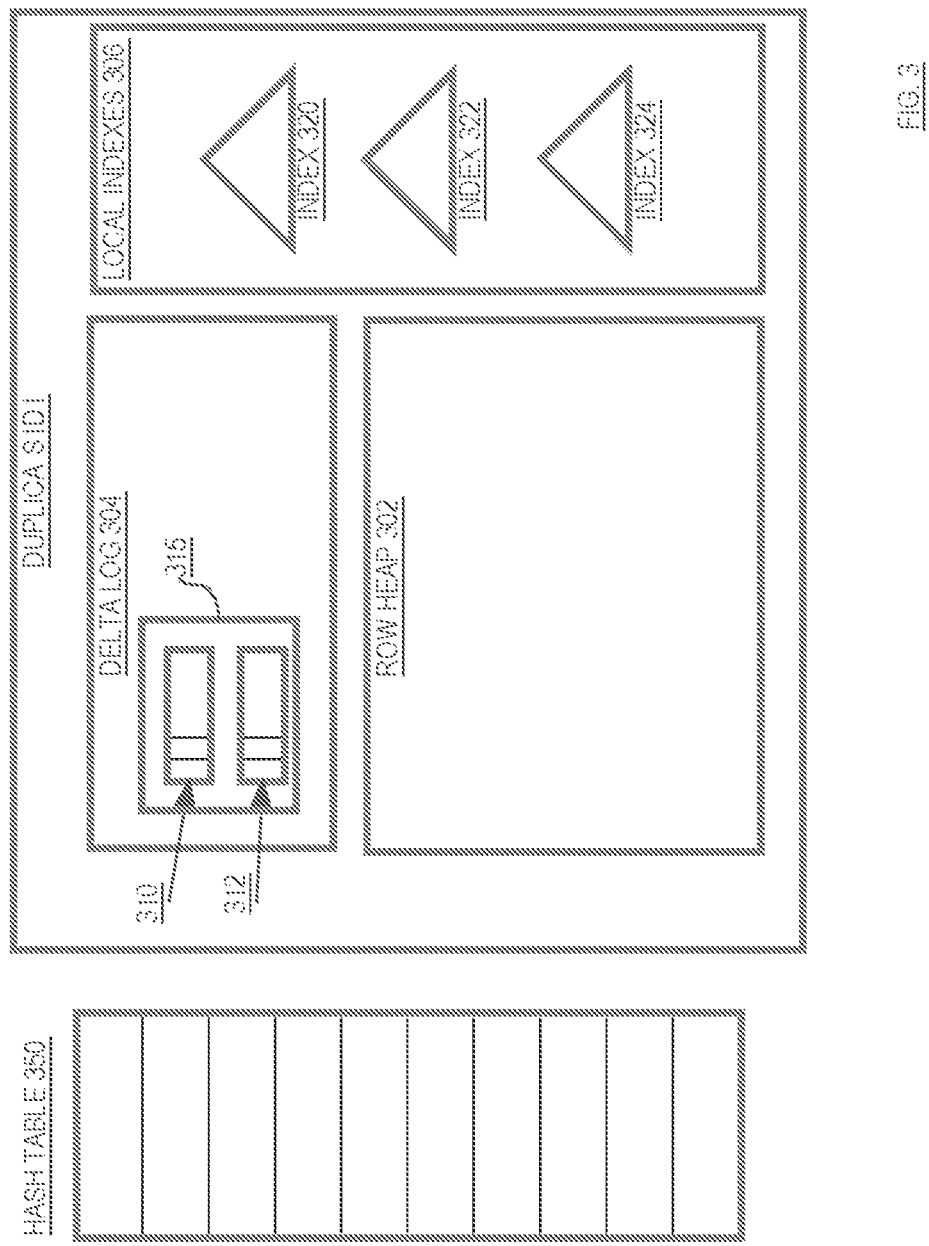
FIG. 3 is a block diagram that illustrates contents of a duplica of a slice, according to an embodiment.

Referring to FIG. 3, it illustrates the various structures, within a duplica, for improving performance and supporting versioning, according to an embodiment. Specifically, duplica S1D1 includes a delta log 304 that contains delta log entries 310 and 312, and a row heap 302 that initially includes no entries. Duplica S1D1 also includes local indexes 306, which include indexes 320, 322 and 324. Each of the structures contained in duplica S1D1, and how those structures are used to efficiently accessed specific versions of rows stored in slice S1, shall be described in greater detail below.

The Delta Log: Temporary Storage or Row Data

The delta log 304 and row heap 302 are collectively used to store versions of rows that belong to slice S1. The delta log 304 serves as short-term storage for row data, while the row heap 302 serves as longer-term storage of the row data. Changes made to a row are first placed in entries within delta log 304, and then eventually "applied" to row heap 302 to create new entries in row heap 302. Thus, entries in delta log 304 represent changes to the rows of slice S1 that are not yet reflected in the row heap 302. The changes represented in a delta log entry may by committed or uncommitted. Any given row may have its data spread between entries in the delta log 304 and entries in the row heap 302.

For example, assume that slice S1 is initially empty. At that point, a transaction TX1 may insert two rows (R1 and R2) into table T1, where those rows have primary keys that fall into the range associated with slice S1. When executing TX1, engine instance 200B (the engine instance local to the primary duplica S1D1 of slice S1) will cause two log records to be generated (one for each newly inserted rows). The two log records will be stored in delta log 304. For the purpose of illustration, it shall be assumed that delta log entry 310 is the log entry for the data that transaction TX1 inserted as row R1, and that delta log entry 312 is the log entry for the data that transaction TX1 inserted as row R2.

According to one embodiment, the delta log 304 is implemented as a circular buffer for temporarily storing delta log entries. The circular nature of the delta log is illustrated in delta log 714 of FIG. 7. As DML operations are performed on a slice, new log entries are added to the delta log of the primary duplica of the slice. In addition, those log entries are propagated to the secondary duplicas of the slice, where the log entries are added to the delta logs at those secondary duplicas.

Older delta log entries in a delta log are "applied" to the row heap to make room for new entries to be added to the delta log. If the transaction that made the changes that are reflected in the new row heap entry has committed, the new row heap entry includes the commit time of the transaction. Otherwise, the new row heap entry includes the transaction ID of the transaction. In some cases, a new row heap entry will contain a "full-row version". That is, the new row heap entry will include values for all columns of the row as they existed at the time that the changes reflected in the row heap entry were made to the row.

In the case where an applied delta log contains values for all columns of a table, the row heap entry that is created when the delta log entry is applied can simply obtain its column values from the delta log entry. In the case where an applied delta log does not contain values for all columns of the table, and the new row heap entry is to contain a full-row version, then the full-row version must be constructed. To construct a full-row version of a row, the engine instance that manages the duplica in question "stitches together" (a) the column values in delta log entry and (b) values obtained from older row heap entries for the row.

Rather than create a full-row version, a delta log entry may be applied by creating a row heap entry that contains a sparse-row version of the row. A sparse-row version of a row contains less than all of the column values of the row.

As shall be explained in greater detail hereafter, in situations where the new row heap entry is sparse, the missing values for the row that are required by a read operation may obtained by following a pointer to the previous row heap entry for the same row. If that previous row heap entry is also sparse and does not contain all of the needed column values, the process of following pointers to previous row heap entries for the row is repeated until all values required to satisfy the read operation are obtained.

Log Records

Delta log entries are stored in log records within the delta log 304. According to one embodiment, a log record may store all delta log entries that are generated for a slice during execution of a transaction fragment. Thus, if the same transaction fragment inserted both row R1 and R2 in slice S1, then the corresponding delta log entries 310 and 312 would both be contained within the same log record 315. When a log record, such as log record 315, includes multiple delta log entries, the log record is not deallocated until all delta log entries contained therein have been applied to the row heap 302.

For the purpose of explanation, it shall be assumed that each log record has a single delta log entry in examples given hereafter. However, the techniques described herein are not limited with respect to the number of delta log entries that may be contained in a single log record.

The Row Heap: Long-Term Storage of Row Data

As explained above, row heap entries are created when delta log entries are "applied" to the row heap. Once applied, the delta log entries may be deallocated so that the space in the delta log that was occupied by the applied delta log entries may be reused to store new delta log entries. For any given row, the delta log entries for the row and the row heap entries for the row are connected using pointers to form a linked list. Within the linked list, the entries are ordered chronologically to form a chronological entry chain for the row. Chronological entry chains shall be described in greater detail hereafter.

Referring to FIG. 8, it illustrates the content of a row heap entry 800, according to an embodiment. Row heap entry 800 includes transaction information 806, a reference to a previous version of the same row 808, an indicator of the columns for which the heap entry has values 810, and the values for those columns 812.

The transaction information 806 includes information about the transaction that made the changes contained in the row heap entry. For example, before the transaction commits, the transaction information 806 may include the transaction ID of the transaction. The transaction ID may be used to look up the status of the transaction in a transaction table. After the transaction commits and row heap entry 800 is cleaned out, the transaction information 806 may include the commit time of the transaction.

The previous-row-reference 808 contains a reference to another row heap entry. The row heap entry pointed to by the previous-row-reference is the row heap entry (a) for the same table row as row heap entry 800, (b) that includes values for that row that were committed immediately before the changes reflected in row heap entry 800 were made. If row heap entry 800 is the first row heap entry for the row in question, then previous-row-reference 808 will be null. As shall be described hereafter, the links created by the previous-row-references form part of the linked list referred to as the chronological entry chain of the row.

The number-of-columns information 810 indicates the number-of-columns for which data is stored in the heap row entry 800. If row heap entry 800 is a sparse-row entry (i.e. the entry contains column values for less than all of the columns of the table, then the columns for which row heap entry 800 has data may be indicated using a bitmap. For example, if table T has four columns, and row heap entry 800 is for a row of table T but only has values for the first and fourth columns, then the number-of-columns field 810 may include the bitmap "1001", with the first and fourth bits set to indicate that values for the first and fourth columns are contained in the row heap entry 800.

The data columns field 812 contains the actual values for the columns. If row heap entry 800 is the row heap entry that corresponds to the initial insertion of the row, then data columns field 812 will contain values for all columns. If row heap entry 800 corresponds to a later DML operation performed on an already-inserted row, then the data columns field 812 may contain values for all columns (if row heap entry 800 is a full-row version) or values for a subset of the columns (if row heap entry 800 is a sparse-row version).

The other metadata field 814 includes other metadata associated with the row heap entry 800. For example, the other metadata field 814 may include various flags, as well as a checksum to verify that the row heap entry has not become corrupted.

Chronological Entry Chain of a Row

As explained above, the most recent change to a row may be contained in a delta log entry, where the delta log entry points to a row heap entry that contains an older version of the row. However, a given row is not limited to a single delta log entry and/or a single row heap entry. Rather, the same row (e.g. R1) may have any number of delta log entries and any number of row heap entries.

According to one embodiment, the entries (both delta log entries and row heap entries) for a row are linked chronologically to form a "chronological entry chain" for the row. The "tail" of a row's chronological entry chain contains the most recent change to the row, while the "head" of a row's chronological entry chain contains the oldest available version of the row.

The chronological entry chain for a row may include zero or more delta log entries followed by zero or more row heap entries. For example, as illustrated in FIG. 4, the entries in row R1's entry chain include:

delta log entry 332 that contains a change to R1 committed at time T100
 delta log entry 334 that contains a change to R1 committed at time T90
 row heap entry 342 that contains changes made to R1 at commit time T50 and
 row heap entry 346 that contains all values for R1 that were originally inserted at commit time T10.

In this example, row R1 has a chronological entry chain that includes two delta log entries and two row heap entries. The pointers between the entries in the chronological entry chain of row R1 are illustrated in FIG. 4, where delta log entry 332 (which has the most recent change to R1) is at the tail of the chronological entry chain of R1 and row heap entry 346 (which has the oldest available data for R1) is at the head of the chronological entry chain of R1.

Figure 4:
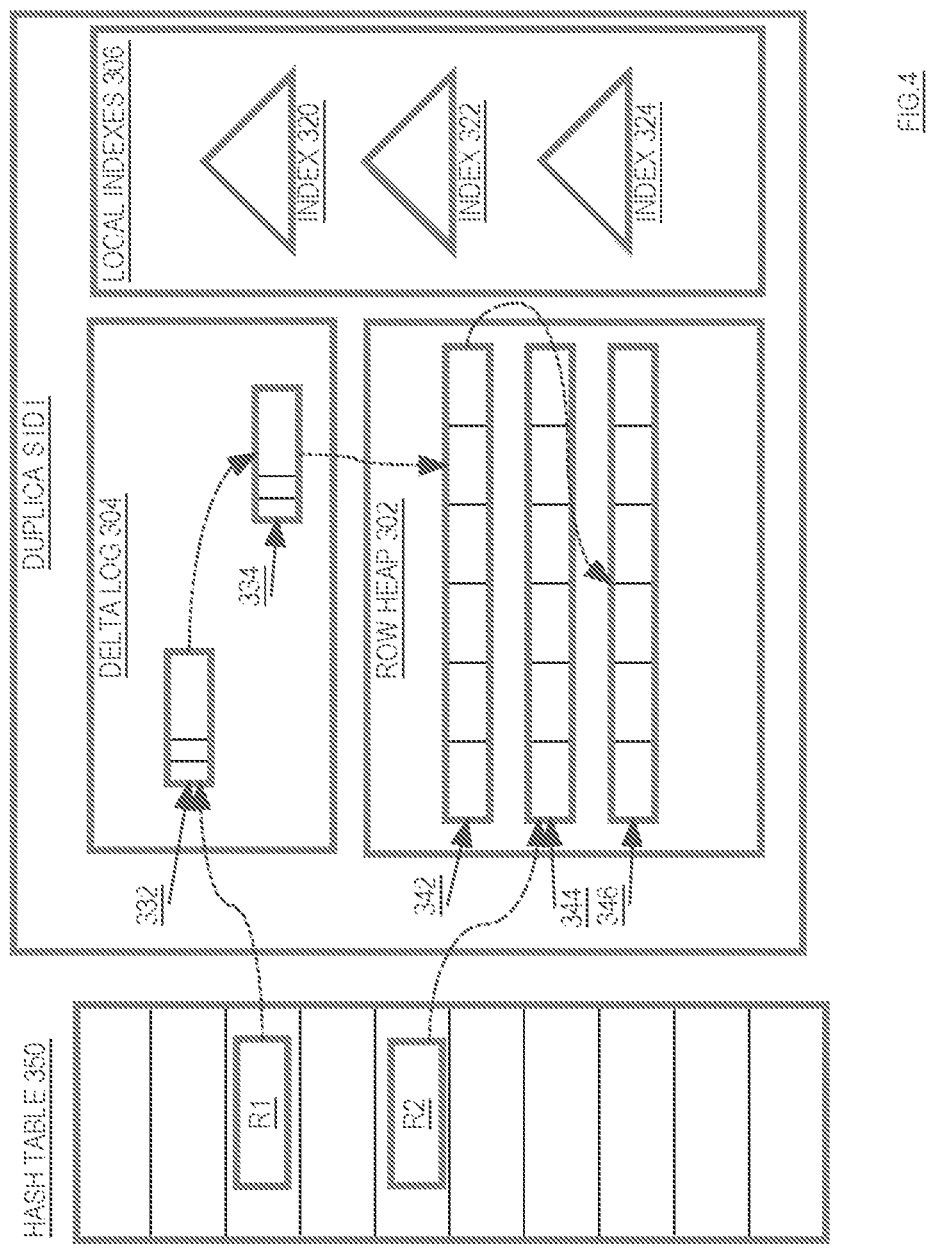
FIG. 4 is a block diagram that illustrates chronological entry chains of two rows R1 and R2, according to an embodiment.

In contrast, the chronological entry chain for row R2 in FIG. 4 contains only a single entry (row heap entry 344). Thus, the hash table entry associated with the primary key of row R2 points directly to row heap entry 344.

As shall be explained hereafter, the chronological entry chain for a row includes the data to reconstruct all available versions for a row. Consequently, the system is able to provide the data from a row as of any specified snapshot time, as long as that snapshot time is not older than the oldest version of the row stored in the chronological entry chain for the row.

Hash Table Access

According to one embodiment, each engine instance maintains a per-duplica hash table for accessing the rows in each duplica to which it has access. For example, engine instance 200B maintains hash table 350 (FIGS. 3 and 4) for accessing the rows in duplica S1D1. According to one embodiment, the hash table entry for a row points to the tail of the chronological entry chain of the row.

To access a row's chronological entry chain using the hash table, an engine instance applies a hash function to the primary key of the row to produce a hash value that corresponds to a hash bucket within hash table 350. Within that hash bucket is stored an entry for the row that has that primary key (if a version of the row has been stored in the slice). The hash table entry for a row includes a pointer to the tail of the chronological entry chain for the row.

If the row in question has no delta log entries, then the hash table entry for the row will point to the newest row heap entry for the row. Thus, if row R2 is stored only in row heap entry 344, and row R2 has no delta log entries, then the hash table entry for row R2 will point directly to row heap entry 344, as illustrated in FIG. 4.

On the other hand, if the row has one or more delta log entries, then the hash table entry for the row will point to the most recent delta log entry for the row. Thus, in the example illustrated in FIG. 4, the hash table entry for row R1 points to delta log entry 332 (the tail of the chronological entry chain for R1).

The hash table 350 may be implemented in any one of a variety of ways, and the techniques described herein are not limited to any particular hash table implementation. According to one embodiment, a hash function is applied to a primary key to generate a hash value. A first subset of the bits of the hash value are used to identify a hash bucket into which the primary key falls, and a second subset of the bits of the hash value are used as an offset into that hash bucket. The hash entry for the primary key is then stored at the location, within the specified hash bucket, that begins at the specified offset. If the primary keys of two rows "collide" (produce the same bucket and offset), then any one of a number of collision resolving techniques may be used. The techniques described herein are not limited to any particular collision resolving technique.

According to an alternative embodiment, the first set of bits (e.g. bits 0-7) are used to identify a bucket, and the second set of bits (e.g. bits 8-15) are compared with each tag in a "hash tag array" that is stored within the bucket. The hash tag array may be, for example, bits 8-15 of the hash value produced by the primary key associated with each of the hash bucket entries. A SIMD operation may be used to compare, in a single operation, bits 8-15 of the primary key in question with each 8 bit entry in the hash tag array. The result of the SIMD operation will indicate which hash table entries, within the bucket have the same bits 8-15 as the primary key in question. Since this comparison is based on fewer bits than the entire primary keys, the result of the comparison may produce false positives. For example, the comparison may indicate that three hash entries have hash values whose bits 8-15 "match" the hash value of the primary key in question. At least two of those matching hash entries must be false positives, since a table may have a maximum of one row for any given primary key.

To ensure that a "matching" hash table entry is actually for the primary key in question, the pointer in the hash table entry may be followed to the entry at the tail of the chronological entry chain for the row associated with the hash table entry. That chronological entry chain tail, whether it be a delta log entry or a heap row entry, will include the entire primary key for the row. The primary key for the row may then be compared to the primary key in question to determine whether the primary key of the row actually matches the primary key in question, or whether the match was a false positive.

Inserting a New Row into a Duplica

When the engine instance that hosts the primary duplica of a slice receives a request to insert a new row into the slice, the engine instance generates a delta entry for the change and stores the delta entry in a log record within the delta log of the primary duplica of the slice. The engine instance then stores, in the appropriate bucket of hash table 350, a hash table entry for the row. The hash table entry points to the new delta log entry.

In addition to storing the hash table entry and delta log entry for the new row, the engine instance propagates the log entry to the hosts that have secondary duplicas of the slice into which the row was inserted. Within each of those hosts, the log entry for the new row is stored in the delta logs of the respective secondary duplicas, and hash table entries are created to point to those newly stored delta log entries. Thus, on every duplica of the slice, the newly inserted row starts with a single-entry chronological entry chain.

Reading Data from an Existing Row

As mentioned above, read operations may be performed by any engine instance that has access to any duplica of the slice that contains the desired data. Further, read operations may be performed as of any specified snapshot time, as long as the snapshot time is not older than the oldest version of the row in the chronological entry chain of the row. Read operations are performed by:
  determining the slice from which data is to be read
  using the slice-to-engine-instance mapping, selecting a host that has access to a duplica of the slice (may be a primary or secondary duplica)
  at the selected host, causing the appropriate engine instance to perform a hash operation on the primary key of the row from which data is to be read,
  using the resulting hash value to locate the appropriate hash bucket within the hash table,
  locating the hash table entry for the row in question within that bucket,
  using the pointer from the hash table entry to locate the tail of the chronological entry chain for the row, and
  reading the desired data from the entries that belong to the entry chain of the row In some situations, the entry pointed to by the hash table entry of a row will not contain all of the data needed for a requested operation on a row. For example, the operation may require values from columns c1 and c2 of R1, and delta log entry 332 may only have a value for column c1. As another example, the operation may require the value of c1 from R1 as of a particular snapshot time (e.g. T50). However, the value of c1 contained in delta log entry 322 may be associated with commit time T100. Consequently, the read operation requires an older version of c1 than the version contained in delta log 322.

The commit time stored in each entry indicates the snapshot to which the data in the entry belongs. If cleanout has not yet been performed on an entry, the entry will contain a transaction ID rather than a commit time. Under these circumstances, the engine instance performing the read can use the transaction ID to look up the status of the transaction in a transaction table. If the transaction is committed, the commit time of the transaction that is specified in the transaction table is the commit time of the entry that includes the transaction ID. If the transaction is still active, then the entry is skipped because uncommitted changes cannot be provided to any read operation. If the transaction is not committed and is in a state other than active, additional work may be required to determine whether the read operation should see the changes in the entry, as shall be described in greater detail hereafter.

When the entry pointed to by the hash table entry of a row does not have all of the data of the row that is required by the specified read operation, the engine instance traverses the links between the entries of the row's chronological entry chain until all of the required data is obtained. In the case of R1, that may require going from delta log entry 332, to delta log entry 334, to row heap entry 342, to row heap entry 346.

The engine instance need not always follow a row's chronological entry chain all the way to the head of the chronological entry chain to obtain the data needed for a read operation. For example, the data required by a read operation may be obtained after reading only a subset of the entries in the chronological entry chain. Thus, if a request is to read the latest version of c1 for R1, then that may be available directly from the delta log entry 332, without traversing any additional links in R1's chronological entry chain.

According to one embodiment, all read operations are performed without obtaining any locks. Thus, reads do not block write operations or other read operations, and write operations do not block read operations. As long as the entry chain for a row in a duplica (either primary or secondary) has data committed as of the snapshot time of a read operation, the engine instance performing the read operation may obtain the data it needs from the entries in the entry chain for the row in the duplica without obtaining a lock and without blocking any concurrent writes or reads to the same row.

Local Indexes for Primary Key Columns

As illustrated in FIG. 3, a duplica may store any number of local indexes 306. In the embodiment illustrated in FIG. 3, duplica S1D1 includes local indexes 320, 322 and 324. Local indexes 306 may be implemented in a variety of ways. For the purpose of explanation, it shall be assumed that local indexes 306 are implemented using B-tree structures. However, the techniques described herein are not limited to the use of any particular index structure for implementing local indexes 306.

A local index may be built on the primary key of a table. Such an index would generally be unnecessary for point look ups (e.g. finding a single row based on the row's primary key), since that is the purpose of the hash table. However, a local index built on the primary key may be useful, for example, to facilitate range scans. For example, if a request is for the names of people who have social security numbers within the range 555-55-5555 and 555-55-9999, then a B-tree index may be traversed to find the index entry associated with the first primary key that is equal to or greater than "555-55-5555". The first matching primary key may be obtained from that entry. From that index entry, a leaf-node-to-leaf-node linked list may be followed, obtaining the primary keys from each index entry thus visited, until an index entry is encountered that has a primary key greater than 555-55-9999. The primary keys thus obtained may then be used to index into the hash table to obtain the data from the chronological entry chains of the rows whose primary keys fall into the specified range.

According to one embodiment, when a local index is built on the primary key in order to facilitate range scans, rather than include entire primary keys, the leaf node index entries may simply include a pointer to the hash table entry associated with the row. In such an embodiment, the engine instance locates the hash table entry directly from the pointer in the index entry, rather than having to apply the hash function to the primary key to obtain a hash value, and then looking up the hash table entry in the hash bucket that is associated with the hash value.

According to an alternative embodiment, the entries in the leaf nodes of an index built on the primary key include the hash value produced by the primary key of the row that corresponds to the index entry. Based on the hash value obtained from the index entry, a range-based scan operation may locate the appropriate bucket in the hash table. The hash table entries in that bucket may then be examined to identify any hash table entries that have primary keys that fall into the range specified for the scan. The pointers in those entries, if any such entries exist, point to the tails of the chronological entry chains of the rows whose primary keys (a) hash to that hash table bucket, and (b) fall into the range specified for the scan.

Deferred Index Maintenance on Deletes

As mentioned above, a local index may be built on the primary key to facilitate range scans based on the primary key. Under normal circumstances, such a local index would have to be updated in response to DML operations that affect rows in the slice associated index. For example, if a new row with a primary key of PK7 is inserted, an entry for that primary key PK7 would have to be (a) added to the hash table, and (b) inserted in the appropriate position within the index. Similarly, if a row with primary key PK9 is deleted, then (a) the hash table entry associated with the primary key PK9 is deleted, and (b) the index entry associated with primary key PK9 is deleted.

According to one embodiment, to improve performance of DML operations that delete rows, the deletion of the corresponding index entries is deferred. Thus, deletion of the row associated with PK9 would result in deletion of the hash table entry for PK9, but not in deletion of the index entry for PK9.

Because the hash table entry is deleted, the system will not respond to read requests with already-deleted data even though the entries for deleted rows remain in the index. For example, assume that after the row associated with PK9 is deleted, the system receives a request to read data from the rows whose primary keys fall in the range PK1-PK10. In response to the request, the system may use the local index built on the primary key to determine that the slice to which the range PK1-PK10 maps has rows associated with the primary keys PK4, PK9 and PK10.

Based on this information, the scan operation will use the hash table to find the chronological entry chains for the rows with primary keys PK4, PK9 and PK10. When the scan operation attempts to find the hash table entry for PK9, it will not find it because the hash table entry for PK9 has been deleted. Based on the absence of a hash table entry for PK9, the scan operation will skip PK9 and only return data from the rows associated with PK4 and PK10.

Local Indexes for Non-Primary Key Columns

Local indexes may be used to locate rows based on values from columns other than the primary key column. For example, for table T, the primary key column may be social-security-number, but a query may ask for the ages of all people with the first name "Amy". To find rows that satisfy a predicate involving the "firstname" column, index 320 may be built based on values from the firstname column. Index 320 may then be traversed based on the name "Amy" to find a leaf node with an entry for "Amy".

According to one embodiment, rather than contain pointer(s) to the row(s) with the firstname "Amy", the index entry for "Amy" within index 320 includes the primary key of each row with the firstname "Amy". After obtaining the primary keys of the rows with firstname "Amy", the engine instance hashes the primary keys to find the corresponding entries in hash table 350, and follows the pointers in those entries to obtain the data from the corresponding entry chains for those rows.

Figure 7:
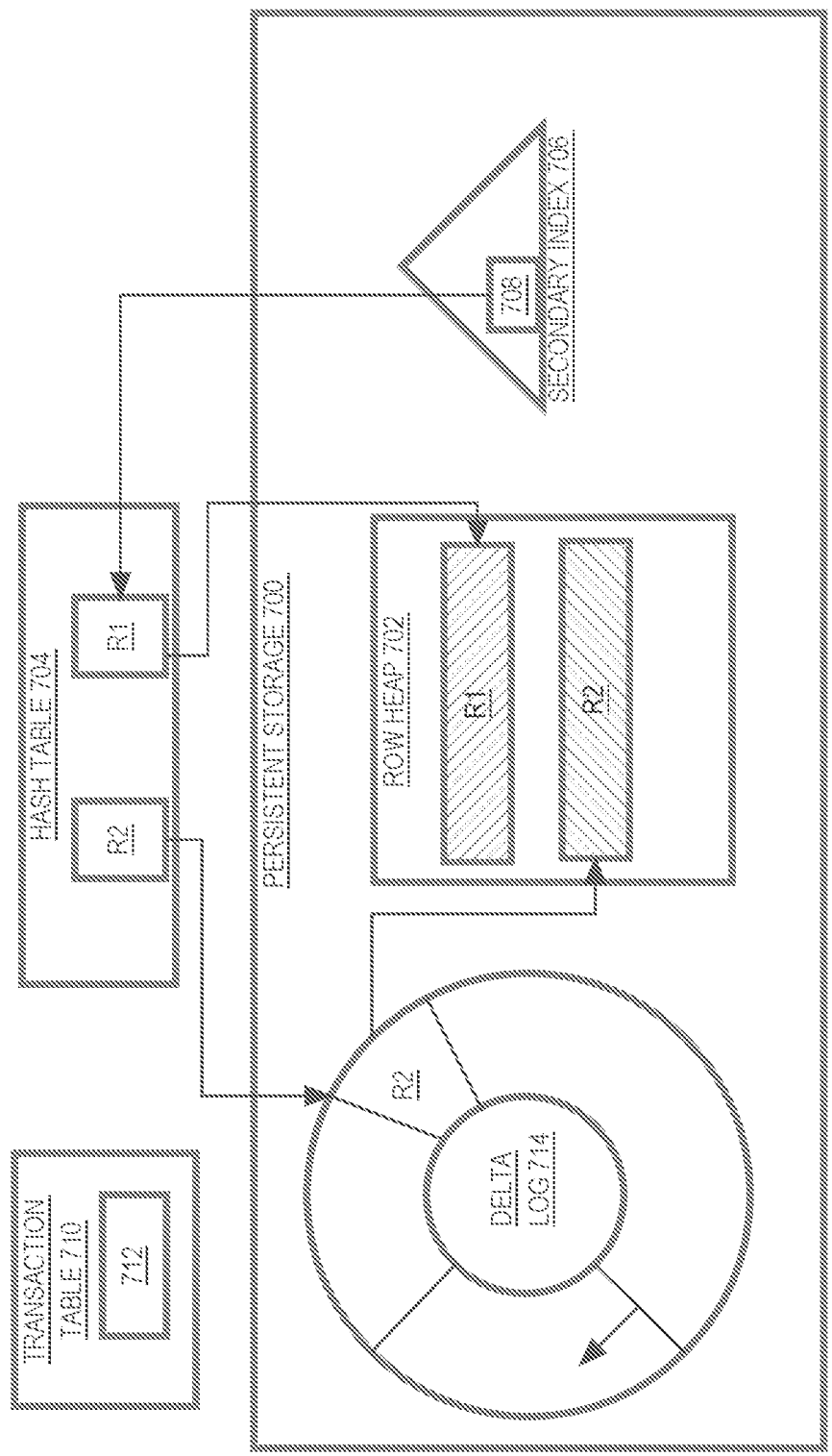
FIG. 7 is a block diagram that illustrates the circular buffer nature of a delta log, according to an embodiment.

Referring to FIG. 7, it is a block diagram that illustrates how a secondary index 706 that is built on a non-primary-key column may be traversed based on a value to find the primary key of a row that has that value in the non-primary-key column. For the purpose of illustration, it shall be assumed that secondary index 706 is built on the firstname column, that the request is for rows with the firstname of "Amy" and that row R1 is the one row that includes the firstname "Amy"

Under these circumstances, the secondary index 706 is traversed based on the key value "Amy" to locate the index entry 708 associated with the key value "Amy". The index entry includes the primary key of row R1. The primary key of row R1 is then be used find the hash table entry for that primary key. The hash table entry points to the tail of the chronological entry chain for row R1. In the example shown in FIG. 7, the chronological entry chain for row R1 includes only one entry, which is a row heap entry in row heap 702.

In contrast to the chronological entry chain for row R1, the chronological entry chain for row R2 in FIG. 7 includes one delta log entry in delta log 714 and one row heap entry in row heap 702. Consequently, the hash table entry for row R2 points to the delta log entry for row R2, which in turn points to the row heap entry for row R2.

Global Secondary Indexes

When local indexes are maintained for a non-primary column, such a firstname, then such a local index must be maintained for every slice, and the local index for the slice must be on every duplica of the slice. This is because it is not possible to know which slice or slices have rows where the firstname is "Amy", for example. Thus, for each slice, its respective local firstname index must be searched to determine if that slice has any rows where the firstname is "Amy".

As an alternative to maintaining per-slice local indexes for non-primary columns, a single "global" index may be maintained for such columns. Such a global index would be similar to a local index, but the global index would contain entries for all rows of the table, regardless of the slices to which they belong. Thus, the index entry associated with "Amy" in such an index would include the primary keys of all rows of the table whose firstname value is "Amy". Those primary keys may then be used, in conjunction with the range-to-slice mapping, to identify the slices to which each row retrieval request should be directed. The read requests may then be sent to the hosts that manage duplicas of those slices.

Performing DML on an Existing Row

Transactions that perform DML operations on an existing row (a row that already has a chronological entry chain in a duplica) are executed by:
- creating a new log entry that includes the change to the row,
- storing the new log entry in the delta log of the primary duplica of the slice that contains the row,
- propagating the new log entry to hosts that have secondary duplicas of the slice,
- causing the new log entry to point to the previous tail of the chronological entry chain for the row, and
- causing the hash table entry for the row to point to the newly added entry (which is the new tail of the chronological entry chain for the row)

Figure 5:
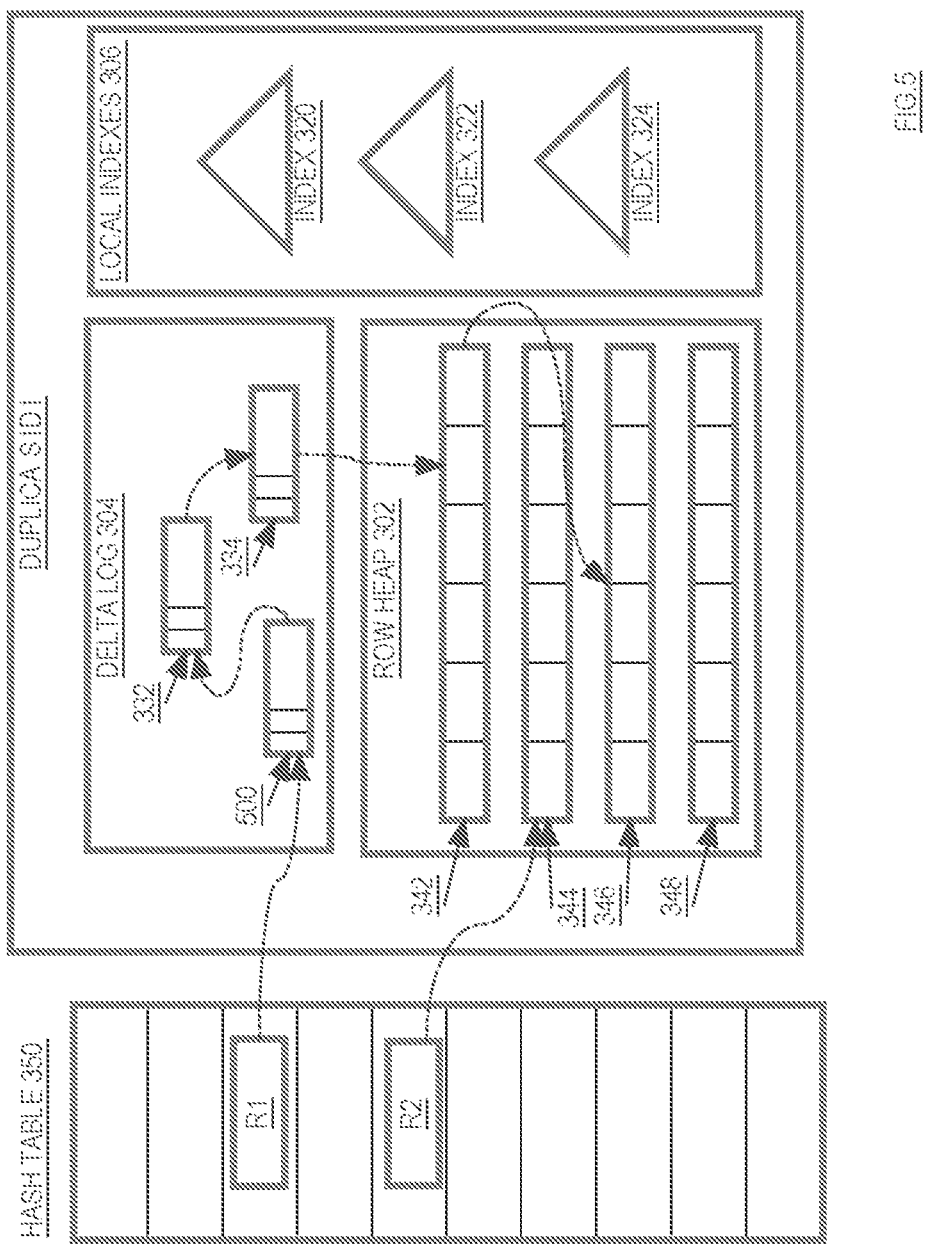
FIG. 5. is a block diagram that illustrates the chronological entry chain of row R1 after an entry is added to the tail of the chronological entry chain, according to an embodiment.

For example, assume that the chronological entry chain for row R1 includes four entries, as illustrated in FIG. 4. In response to a DML, operation that performs a change to row R1, the change made by the DML operation is stored in a new delta log entry 500 (shown in FIG. 5). The new delta log entry 500 points to delta log entry 332, which was the previous tail of row R1's chronological entry chain. The hash table entry for row R1 is then updated to point to the new delta log entry 500, as illustrated in FIG. 5.

Applying Delta Logs to the Row Heap

As mentioned above, when a row is initially added to a duplica, the row is typically added as a delta log entry. However, delta log 304 serves as temporary storage for row data that ultimately should be applied to the row heap 302. In one embodiment, a background process periodically applies delta log entries to the row heap 302.

For example, assume that the delta log 304 has a delta log entry for a newly inserted row R3. At this point, the chronological entry chain for R3 consists of only that one delta log entry (to which the hash table entry for R3 points). To apply the delta log entry for R3 to row heap 302, a row heap entry that contains the content of the delta log entry of R3 is stored in row heap 302. The hash table entry for R3 is updated to point to the new row heap entry, and the delta log entry can be garbage collected/reused.

When a row's chronological entry chain includes one or more row heap entries, the oldest delta log entry (or entries) for the row must be applied before any newer delta log entries for the row. For example, referring to FIG. 5, delta log entry 334 must be applied before applying delta log entries 332 and 500. Under these circumstances, applying a delta log entry to the row heap involves:
- making a new row heap entry with the contents of the delta log entry being applied, and
- patching the pointers in the chronological entry chain of the row so that:
  - the applied delta log entry is removed from the chronological entry chain, and
  - the new row heap entry is inserted into the chronological entry chain of the row in the same position that was previously occupied by the applied delta log entry For example, referring to FIG. 5, in the chronological entry chain for row R1, delta log entry 334 is after delta log entry 332 and before row heap entry 342. To apply delta log entry 334 to the row heap 302, a new row heap entry (e.g. row heap entry 348) is created. Row heap entry 348 is populated with at least the contents of delta log 334. Doing so may create a sparse row heap entry (a row heap entry that includes less than all values of the row as of the commit time associated with the row heap entry). To create a fully-populated row heap entry, row heap entry 348 may be further populated by coalescing all values for row R1 as they existed when delta log entry 334 was created. This may be accomplished by obtaining the missing values from row heap entries that reside further in row R1's chronological entry chain (e.g. row heap entries 342 and 346).

Figure 6:
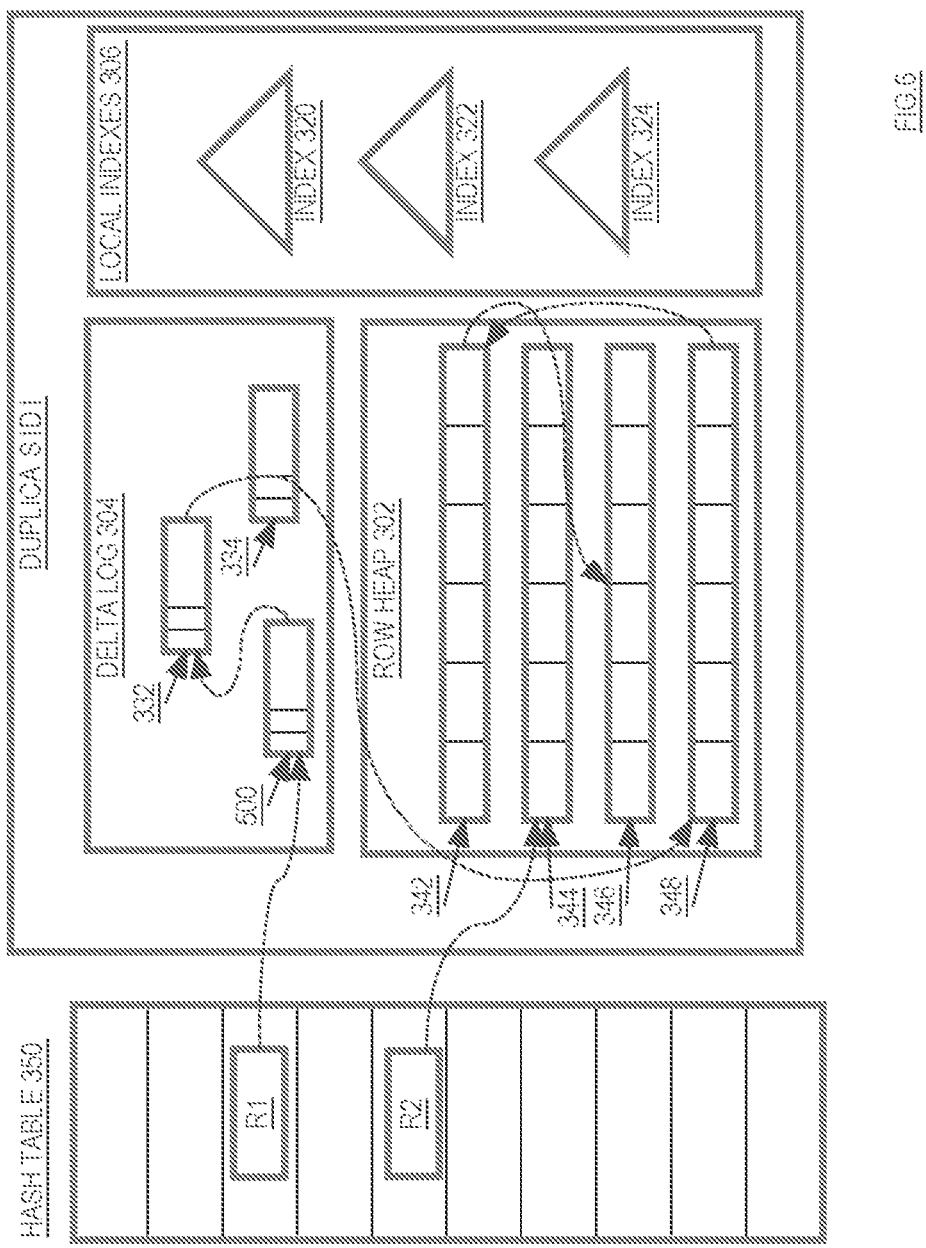
FIG. 6 is a block diagram that illustrates the chronological entry chain of row R1 after a delta log entry in the chain is applied to the row heap, according to an embodiment.

After creating and populating the new row heap entry 348, the pointers of R1's chronological entry chain are updated so that the new row heap entry 348 replaces the applied delta log entry 304 within R1's chronological entry chain. In the present example, updating the pointers includes causing delta log entry 332 to point to the new row heap entry 348, and causing row heap entry 348 to point to row heap entry 342. These changes are illustrated in FIG. 6. After these pointer changes have been made, delta log entry 334 is no longer part of the chronological entry chain for row R1, and the space occupied by delta log entry 334 may be deallocated/reused.

Propagating Changes Made by DML Operations

As mentioned previously, all DML operations that affect data in a slice are made to the primary duplica of the slice. However, for the secondary duplicas to be available for read operations, those changes made at the primary duplica must be propagated to the secondary duplicas. According to one embodiment, changes made to the primary duplica of a slice are propagated to the secondary duplicas by sending a log record that contains information about the changes to the hosts that are hosting the secondary duplicas.

For example, returning to FIG. 2, a DML operation that targets data in slice S1 would be performed by engine instance 200B (which hosts S1D1, the primary duplica of S1). In the primary duplica (S1D1), the change may be made by (a) generating a log record for the change, and (b) storing the log record for the change as a delta log entry in the delta log of the primary duplica (S1D1). The log record is then propagated from host 200A to host 202A (which hosts S1D2, the secondary duplica of S1).

Changes made to a slice are propagated to all secondary duplicas of the slice. Thus, changes made to slice S3 would be made at primary duplica S3D1 on host 202A and propagated to both host 204A (with has secondary duplica S3D3) and to host 208A (which has secondary duplica S3D2).

The Content of Log Records

According to one embodiment, the content of the log records that are propagated to secondary replicas of a slice is similar to the content of the delta log record for the change that is stored in the primary duplica of the slice. Specifically, according to one embodiment, the content of the log records that are stored as delta log records at the primary duplica of a slice and propagated to the secondary duplicas of the slice include:

the transaction ID of the transaction that performed the change reflected in the log record the primary key of the row affected by the DML operation the change made by the DML operation (e.g. the updated column value(s))

an indication of which statement, within a transaction, specified the DML operation an indication of the type of DML operation (e.g. insert, update, delete, etc.)

an indication (last-log-of-statement flag) of whether the log record is the last log record for the statement The indication of which statement, within the transaction, is specified by the DML operation may be made by (a) assigning a number to each statement, and (b) including the number of the statement in every log record generated while executing the statement. For example, if a transaction TX1 has three statements ST1, ST2, and ST3, then the three statements may be assigned the respective numbers of 1, 2 and 3. All log records generated for changes made by statement ST1 would then include the statement number 1, while all log records generated for changes made by statement ST2 would include the statement number 2. In the case where a statement, such as statement ST2 causes multiple log records to be generated, the last of the log records will contain a last-log-of-statement flag to indicate that it is the last log record for statement ST2. As shall be described in greater detail hereafter, the statement numbers and last-log-of-statement flags are used to ensure that a secondary duplica has received all of a transaction's log records when the transaction commits or fails over to the host of the secondary duplica.

The transaction ID in a log record may be used to determine the status of the transaction that made the change that is reflected in the log record. For example, referring to FIG. 7, assume that the delta log entry for row R2 includes the transaction ID TX2. That transaction ID may be used to look up a transaction table entry 712 for transaction TX2 in a transaction table 710. Transaction table entry 712 contains information about the status of transaction TX2. For example, the transaction may indicate whether transaction TX2 is executing, preparing, committing or committed. If committed, the transaction table entry 712 will indicate the commit time of transaction TX2.

Cleanout of Entries

When a transaction commits, the delta log entries and/or row heap entries that correspond to changes made by the transaction may be updated to include the commit time of the transaction. By placing the commit time in the entries themselves, the need to look up the transaction in the transaction table is avoided. The process of updating the entries associated with a committed transaction to reflect the commit time of the transaction is referred to as "cleanout". Cleanout may be performed, for example, by replacing the transaction ID in the entry with the commit time of the transaction.

For entries that have not yet been cleaned out, but which correspond to committed transactions, the version of the data contained in the entry is determined by looking up the transaction in transaction table 710 to determine the commit time of the transaction.

Once a cleanout operation has been performed on an entry, that commit time that is stored in the entry serves to indicate the "version" of the row to which the associated entry belongs. The version of cleaned out entries may thus be determined without having to use the transaction table 710 to look up the status of the transaction that made the change that is reflected in the entry.

Cleanout of the logs generated by a transaction need not be performed at the time the transaction commits. Rather, cleanout can be performed, for example, periodically by a background process.

Semi-Synchronous Propagation of Log Records

As mentioned above, when a DML operation makes a change to data in a slice, the change is made by generating a log record that reflects the change, storing the log record in the delta log of the primary duplica of the slice, and propagating the log record to the secondary duplicas of the slice. However, according to one embodiment, performance of DML operations is improved by performing the propagation of log records to the secondary duplicas "semi-synchronously".

The propagation of log records to secondary duplicas is semi-synchronous in that the engine instance that propagates the log records for a change reports to the client that requested the change that the change was successful without waiting to receive acknowledgements that the log records for the change were successfully propagated to the secondary duplicas. For example, assume that a client requests insertion of a row, where the primary key of the row falls into a range that is mapped to slice S3. Under these circumstances, the insert request is executed by engine instance 202B on host 202A, which hosts the primary duplica of slice S3 (S3D1). During execution of the request, engine instance 202B inserts a delta log entry into the delta log of S3D1, and initiates propagation of the log entry to engine instance 208B (which hosts secondary duplica S3D2 of slice S3) and to engine instance 204B (which hosts secondary duplica S3D3 of slice S3). After initiating propagation of the log entry, but before receiving acknowledgement that the secondary duplicas received the log entry, engine instance 202B reports to the client that the statement that made the change was successfully executed. Because completion of the statement is reported as successful prior to receiving acknowledgement that the log record was received at the secondary duplicas, the changes at the primary and secondary duplicas are not fully synchronous.

According to one embodiment, a driver at the client keeps track of which statements of a transaction have been reported to be successfully executed. As shall be described in greater detail hereafter, the "last successfully executed statement" information maintained by the client is used to resume the transaction (without having to completely restart it) if the transaction fails over to a different host. The fact that the engine instance 202B does not wait for acknowledgements from the secondary duplicas before informing the client that a statement was executed can result in significant performance improvements, since execution of DML operations does not incur acknowledgement-related delays.

According to one embodiment, the engine instance that is making a change that is specified in a statement reports to the client that the statement was successfully executed when:

the log record for the change is stored in the delta log of the primary duplica, and the log record(s) has been placed "on the wire" for transmission to the secondary duplica(s)

In this context, "on the wire" refers to a situation where the log records have been communicated to a failure domain other than the failure domain of the engine instance making the change. Because the engine instance waits until the log record is on the wire, the changes made at the primary duplica and secondary duplicas is also not fully asynchronous. Hence, the term "semi-synchronous" is used to refer to the propagation of log records from primary duplicas to secondary duplicas.

In the present example, assume that host 202A has a Network Interface Card (NIC) that connects host 202A to a network to which hosts 204A and 208A are connected. Under these conditions, engine instance 202B may report that a statement has been successfully executed against slice S3 when the NIC acknowledges receipt of the log record associated with the statement. The NIC may send this acknowledgment prior to actually sending the packet that contains the log record, as long as the log record is stored in memory associated with the NIC (as opposed to the memory in which the engine instance is running). Thus, at the time of the NIC's acknowledgement, the packet containing the log record may not yet have been sent to the hosts of the secondary duplicas. In this example, the NIC constitutes a separate failure domain because, after the NIC has acknowledged receipt, the propagation of the log record from the NIC to hosts 204A and 208A should succeed even if engine instance 202B subsequently fails or hangs.

Redundantly-Connected Hosts

As explained above, NICs and engine instances fall into different failure domains. Thus, log records will be propagated by NICs to the secondary duplicas successfully even though the engine instances that generate the log records fail or hang. However, it is still possible that a double-failure (failure of the engine instance of the primary duplica, and failure of the NIC/network) will result in a situation where a change is not propagated to a secondary duplica even though the client has been told that the corresponding statement succeeded.

Therefore, to decrease the likelihood that secondary duplicas will not receive changes, each host in the system may be connected to each other host through multiple redundant networks. For example, as illustrated in FIG. 2, host 202A may be connected to host 204A through two distinct networks (network1, network2), each with its respective NIC (NIC1, NIC2) in host 202A. Under these circumstances, engine instance 202B may concurrently send the log record for a change to slice S3 to the host 204A through both NICs/networks. Thus, the log record will only fail to arrive at host 204A if both NICs/networks fail, which is a highly unlikely event.

While not shown in FIG. 2, each of the two networks (network1, network2) may connect each host with each other host. Under these circumstances, any communication between hosts will only fail if both networks fail. Further, the number of networks between each of the host may be increased as necessary to ensure the success of communications. For example, in one embodiment, each host is connected to each other host through at least three distinct networks.

Garbage Collection on Row Heap Entries

As explained above, the chronological entry chain for a row grows as DML operations are performed on the row, where each DML operation adds a new entry to the tail of the chronological entry chain for the row. As also explained above, the oldest delta log entry for a row may be applied to the row heap by making a new row heap entry for the row, thereby allowing the space occupied by the delta log entry to be reclaimed. However, if the chronological entry chain for each row is allowed to grow indefinitely, a host will eventually run out of persistent storage space.

Therefore, according to one embodiment, the system periodically reclaims the space occupied by the row heap entry that resides at the head of a row's chronological entry chain. The row heap entry that resides at the head of a row's chronological entry chain is referred to herein as the "head entry". The head entry contains the oldest available version of the row. The space occupied by head entries may be reclaimed, for example, when the timestamp associated with the head entry is older than a designated threshold age. For example, assume that a system has a designated retention time of three days. Under these circumstances, the system is able to handle read requests associated with snapshot times that are up to three days old. If a particular row has a head entry with a commit timestamp that is more than three days old, then the system may deallocate the head entry and reuse the storage space thereof.

When deallocating the head entry of a row, it may be necessary to rewrite the row heap entry that precedes the head entry. The row heap entry the precedes a row's head entry is referred to as the row's "penultimate entry". The penultimate entry may need to be rewritten, for example, when the penultimate entry is a sparse entry.

For example, assume that a row R1 has five columns c1, c2, c3, c4 and c5. Further assume that the head entry for row R1 is a full-row version that has values for all five columns as of time T10. Finally, assume that the penultimate entry for row R1 is a sparse row heap entry with only the values of c1 and c2 as of time T50.

Under these circumstances, deallocating the head entry for R1, without any additional changes, will result in problems. Specifically, after such deallocation, if the system receives a request to read row R1 as of time T50, the values for c3, c4 and c5 as of time T50 will no longer be available.

According to one embodiment, when deallocating the head entry of a row that has a sparse penultimate entry, the system creates a new full-row version of the row that reflects the snapshot time of the penultimate entry. For example, in the case where the penultimate entry for row R1 is a sparse entry with a timestamp of T50, the system creates a full-row version for R1 as of time T50. This full-row version of R1 replaces the sparse penultimate version of R1. Consequently, the pointers of R1's chronological entry chain are revised to:
- remove both the head entry and the penultimate entry from the chronological entry chain of the row, and
- add the new full-row version to the head of the chronological entry chain of the row After the new full-row entry has been added to the head of the chronological entry chain of the row, the space occupied by the old head entry and the old penultimate entry may be deallocated and reused.

Coordinator Selection

Referring again to FIG. 2, when a client requests execution of a transaction, the system 200 selects an engine instance to coordinate the transaction. According to one embodiment, the system selects the coordinating transaction based on the slices that are targeted by the transaction. In the simple case that a transaction only operates on data from a single slice, that slice is designated as the "controlling slice" for the transaction, and the engine instance that manages the primary duplica of the slice is selected as the coordinating engine instance for the transaction. Thus, in the system illustrated in FIG. 2, a transaction that only operated on data from slice S3 would be coordinated by engine instance 202B, which manages the primary duplica S3D1 of slice S3.

In situations where a transaction operates on data from more than one slice, the system selects a controlling slice from among those operated on by the transaction. For example, assume that a transaction operates on data from slice S1 and data from slice S2. In this case, the system would choose either slice S1 or S2 as the controlling slice.

If slice S1 is chosen, then engine instance 200B, which manages the primary duplica S1D1 of slice S1 is designated the coordinator of the transaction. If slice S2 is chosen, then engine instance 204B, which manages the primary duplica S2D1 of slice S2 is designated the coordinator of the transaction.

Various techniques may be used to select a controlling slice when a transaction operates on data from multiple slices. For example, if the transaction operates on slices S1 and S2, but does more work on slice S1 than on slice S2, then slice S1 may be chosen as the controlling slice. In cases where it is not possible to determine, from the transaction itself, the slice(s) that will be changed, the engine instance that received the request from the client may simply select, as the controlling slice, any slice for which it manages the primary duplica, and then assume the role as the coordinating engine instance for the transaction. Thus, it is possible to have situations where the controlling slice of a transaction is not one of the slices that are touched by the transaction.

Alternatively, when a transaction operates on multiple slices, the controlling slice may be selected based on the current workload of the respective hosts. For example, if host 200A is being heavily used while host 204A is relatively idle, then slice S2 may be selected as the coordinating slice, so that the transaction may be coordinated by engine instance 204B on the less-busy host 204A. Yet other embodiments may take into account a variety of factors when selecting the controlling slice of transaction, including but not limited to which host received the request from the client, the current host workload, and the amount of work the transaction must perform on each slice.

In some embodiments, the client contains the logic for selecting the host to whom to send a transaction. The host selection may be made by the client based on the factors described above (e.g. the primary key(s) operated on by the transaction and which hosts manage the primary duplicas of the slices to which those primary keys map). In such an embodiment, the client may maintain a topology cache that indicates the mapping between primary keys and hosts that manage the primary duplicas of the slices to which the primary keys map. In an embodiment where the client selects the host, after selecting the host:
  the client connects to the host,
  a slice whose primary duplica resides at the host is selected as the controlling slice (based on the primary key(s) involved in the transaction), and
  the engine instance that manages that primary duplica serves as the coordinator for that transaction.

In an alternative embodiments, the logic for selecting a controlling slice is on each host. In such an embodiment, the host to which the client sends a transaction may select a controlling slice whose primary duplica resides on a different host. In such a situation, the transaction, and the responsibility for coordinating it, may be forwarded to that other host. Alternatively, the host that initially received the transaction from the client may send a message back to client that tells the client to send the transaction to a different host (i.e. the host that manages the primary duplica of the slice that is selected by request-receiving host as the controlling slice).

Client-Assisted Failover

When an engine instance that is coordinating a transaction fails or ceases to work for any reason, the transaction becomes a "failover transaction" and a new coordinator is selected to resume the failover transaction. According to one embodiment, the new coordinator is selected from among the engine instances that manage secondary duplicas of the controlling slice.

In addition to selecting a new coordinator, all remaining hosts set their logical clocks to max(current clock value, highest timestamp generated by failed host). Techniques for determining the highest timestamp generated by the failed host shall be described hereafter.

With respecting to selecting a new coordinator for a failover transaction, if slice S3 is the controlling slice of a transaction, then engine instance 202B would be initially designated as the coordinator for the transaction (because engine instance 202B manages the primary duplica (S3D1) of slice S3). If engine instance 202B ceases to function, then the system selects a new coordinator for the transaction. In this case, the candidates for coordinating the transaction are engine instance 204B (which manages access to one secondary duplica S3D3 of the controlling slice S3) and engine instance 208B (which manages access to another secondary duplica S3D2 of the controlling slice S3). When there are multiple secondary duplicas of a controlling slice, the new coordinator may be selected based on a variety of factors, such as the busyness of the respective hosts and which host has the most log records for the transaction.

According to one embodiment, if the candidates for becoming the new coordinator for the transaction do not have the same number of transaction log records for the transaction, then the candidate with the highest number of transaction log records is selected. For example, assume that engine instance 208B has more log records for the failover transaction than engine instance 204B. Under these circumstances, engine instance 208B would be selected as the new coordinator for the failover transaction.

Before resuming execution of the transaction at the new coordinator, any transaction log records that are missing at the other candidates are sent from the new coordinator to the other candidates. In the present example, engine instance 208B would send to engine instance 204B any transaction records, from the failover transaction, that were missing in the secondary duplica managed by engine instance 204B. Transaction log records, and how they are used during failover, shall be described in greater detail hereafter.

Once a new coordinating engine instance is selected, the secondary duplica of the controlling slice that is managed by the new coordinating engine becomes the new primary replica of the controlling slice. For example, if engine instance 208B is selected as the new coordinating process for a transaction whose controlling slice is S3, then secondary duplica S3D2 is designated as the new primary replica of slice S3. In addition, the client sends information to engine instance 208B to allow engine instance 208B to resume the transaction that was begun by now-failed engine instance 202B.

To enable engine instance 208B to resume the transaction, the client sends host 208A information about the transaction as well as an indication of the last change that was confirmed by the previous coordinator. For example, before failing, engine instance 202B would have sent the client a series of messages relating to the status of the transaction. Each message may acknowledge that a statement was successfully executed. Thus, the client will have stored the highest statement number whose execution was acknowledged by engine instance 202A prior to failure.

When engine instance 202B fails, the client sends to the new coordinator (engine instance 208B) a request to resume the transaction, along with the highest statement number that was confirmed-executed by the previous coordinator (engine instance 202B). The new coordinator (engine instance 208B) then resumes executing the transaction at that statement that follows the statement associated with the statement number that was received from the client.

For example, assume that a transaction TX1 has ten statements (ST1 to ST10), and slice S3 is selected to be the controlling slice for the transaction. Under these circumstances, engine instance 202B (which manages the primary duplica of slice S3) is selected as the coordinator of the transaction. While performing the transaction, engine instance 202B successfully executes statements ST1 to ST4, sending an acknowledgement message to the client each time a statement is successfully executed. After failover, secondary duplica S3D2 is designated the primary duplica and engine instance 208B becomes the new coordinator for the transaction. The client informs engine instance 208B that ST4 was the last statement to be successfully executed, so the new coordinator (engine instance 208B) resumes execution of the transaction at statement ST5.

Failover Using Semi-Synchronous Propagation of Log Records

As mentioned above, changes may be propagated to secondary replicas semi-synchronously. That is, the coordinator may indicate to a client that a statement has been successfully executed on a primary replica of a slice before the hosts of the secondary replicas have acknowledged receipt of the changes made by the statement.

In embodiments where semi-synchronous propagation of log records is used, the coordinator may send the confirmations to the client after pushing the changes to a different failure domain, such as getting confirmation for the local NIC that the log was received by the NIC. However, even though it is highly unlikely that the secondary duplicas will not receive the log records under these circumstances, it is still possible. Thus, in the example given above, it is possible that the changes made by statement ST4 of the transaction were not propagated to secondary duplicas S3D2 and S3D3.

Therefore, according to one embodiment, after a failover, before the new coordinator to resumes a transaction, the new coordinator confirms that its duplica has the log records for all statements up to and including the last-confirmed statement. In the present example, engine instance 208B does not resume execution of the transaction at statement ST5 until verifying that duplica S3D2 includes all log records of the transaction up to and including the log records for statement ST4 (including the log record containing the end-of-statement-flag for ST4). In the case where any log records are missing, the new coordinator aborts the transaction, which may then be re-executed from the start. In the case where all log records are present, the new coordinator resumes the transaction at the next statement (ST5).

Adjusting Clocks on Host Failure

As mentioned above, when a host fails, all remaining hosts set their logical clocks to max(current clock value, highest timestamp generated by failed host). However, it is not easy to determine the highest timestamp generated by a failed host. Therefore, a leasing technique is used so that non-failed nodes can always know a timestamp that is at least as high as the highest timestamp generated by a failed host.

According to the leasing technique, a "maximum clock value" is communicated to all hosts in the system. The lease grants the hosts permission to generate timestamps up to the maximum clock value. Whenever the logical clock of any host in the system reaches the maximum clock value, the host must request an additional "lease". Upon receiving a new lease request, a new maximum clock value is selected, and the new lease is granted by communicating the new maximum clock value.

In a system that uses this leasing technique, it is guaranteed that no host in the system will have seen a timestamp value that is greater than the current maximum clock value granted by the leasing mechanism. Thus, when a host dies, all of the hosts in the system may set their clocks to the current maximum clock value to guarantee that their clocks are at least as high as any timestamp generated by the failed host node. When the clocks are adjusted in this manner after a host failure, a new maximum clock value is selected and the remaining hosts are granted leases to generate timestamps up to the new maximum clock value.

Deterministic Response Time

According to one embodiment, the system responds to all commands within a specified maximum time. When execution of a transaction would otherwise exceed the specified maximum time, the engine instance that is coordinating the transaction returns to the client the results from the statements of the transaction that have already been executed, along with a resume token. The resume token contains information, such as the number of the last statement executed, that is required for an engine instance to resume the transaction.

Upon receiving the intermediate results and the resume token, the client may resubmit the transaction along with the resume token. The coordinating engine instance assigned to the resubmitted transaction resumes execution of the transaction at the appropriate statement based on the content of the resume token. Use of a resume token in this manner not only allows a guaranteed response time, but it allows the hosts to largely forget the state of the transaction (and therefore free up resources) between the time where the resume token is sent to the client and when the client resends the transaction.

It is possible that, to avoid exceeding the time threshold, the engine instance must stop processing a command midstatement. For example, the command may request the scan of an entire table. Under these circumstances, it is possible that the table is only partially scanned when the time threshold is reached. If the partially-performed scan is being performed in an order based on the primary key, the resume token may include the primary key of the last scanned row. Thus, when the operation is resumed, the scan may resume with the following row. Similarly, if the scan is ordered by another column for which a secondary index exists, the resume token may indicate the last-scanned value from the indexed column. When the operation is resumed, the secondary index on that column may be used to resume the scan at row containing the next value from the indexed column.

Multi-Slice Statements

A single statement may involve multiple slices. For example, a statement may request the scan of a table T that has been divided into the five slices S1-S5 whose duplicas are stored in the system illustrated in FIG. 2. As mentioned above, when a transaction operates on multiple slices, the system selects a controlling slice, and the engine instance that manages the primary duplica of the controlling slice coordinates the transaction.

In the case of a table scan operation, the scan of a given slice may be performed by any engine instance that manages any duplica of the slice. According to one embodiment, the engine instance that is coordinating the transaction allocates the work among the other hosts in a way that maximizes parallelization and workload balancing among the hosts. For example, if engine instance 202B is selected to coordinate a full scan of table T1, engine instance 202B may scan S1D2, and assign engine instance 200B to scan S2D2, assign engine instance 204B to scan S3D3, assign engine instance 208B to scan S4D1, and assign engine instance 206B to scan S5D1. These scan operations may be performed in parallel, with the results being returned to the coordinating engine instance 202B. The coordinating engine instance 202B then sends to results back to the client that requested the table scan.

The logic within an engine instance that coordinates the work of a statement that accesses multiple slices is referred to herein as the statement coordinator. According to one embodiment, the statement coordinator breaks the work required by a statement into statement fragments, where each statement fragment specifies the work to be done by a distinct engine instance. These statement fragments are then sent to their respective engine instances to cause those engine instances to perform the work that is specified therein. Thus, in the present example, the statement coordinator of engine instance 202B creates five statement fragments for the statement that requires a full scan of table T, and sends those statement fragments to the appropriate engine instances to cause the table scan to be performed in parallel.

Transactions

As mentioned above, database operations performed by system 200 are often performed as part of transactions. A transaction is a unit of work that must be performed atomically. Thus, if system 200 has performed some of the work specified in a transaction, but is unable to complete the remainder of the work, then system 200 must abort the transaction and "roll back" the work that has been performed.

Each transaction may have multiple statements. Within each transaction, the statements are executed serially. However, the work of one transaction may be performed concurrently with the work of other transactions. In addition, the work specified within any given statement may be divided up and performed in parallel. As mentioned above, the log record that is generated while executing a statement of a transaction includes both the number of the statement and the transaction ID.

When a transaction commits, the transaction is assigned a commit time from the logical clock of the host in which the coordinating engine instance for the transaction is running. As mentioned above, the engine instance that is selected to coordinate a transaction is selected by determining the controlling slice of a transaction, and then selecting the engine instance that manages the primary duplica of the controlling slice as the coordinator for the transaction.

As also mentioned above, the statements within a transaction may require performance of DML operations on multiple slices. Under these circumstances, the primary duplicas of some of those slices may be managed by engine instances residing on host other than the host to which the coordinating engine instance belongs. For example, assume that a transaction updates data that resides in both slices S1 and S3. Under these circumstances, slice S1 may be selected as the controlling slice. As a consequence of S1 being the controlling slice, engine instance 200B, which manages S1D1 (the primary duplica of slice D1) is selected as the coordinating engine instance.

To perform the DML operation on slice S3, the coordinating engine instance 200B sends a statement fragment to the engine instance that manages S3D1, the primary duplica of slice S3. In the embodiment illustrated in FIG. 2, the engine instance that manages S3D1 is engine instance 202B on host 202A. The statement fragment specifies the work that must be done on slice S3. Engine instance 202B performs the requested work and communicates completion of the work back to coordinating engine instance 200B.

Prerequisites for Committing a Transaction

The coordinating engine instance of a transaction cannot commit the transaction until it has confirmed that all work required by the transaction has been successfully performed. In a system where each slice may have one or more secondary duplicas and each transaction may perform DML on multiple slices, the work of a transaction includes (a) performing DML on the primary duplicas of the slices, and (b) propagating of log records to the secondary duplicas.

Further, performing the DML on the primary duplicas of the slices may involve (a1) the coordinating engine instance performing work on the primary duplica of the controlling slice, (a2) the coordinating engine instance performing work on the primary duplicas of one or more non-controlling slices, and (a3) one or more non-coordinating engine instances performing work on the primary duplicas of one or more other non-controlling slices.

Consequently, a commit protocol is needed to ensure that a transaction is not committed until all of the follow has occurred:

the coordinating engine instance has performed all work requested on the primary duplica of the controlling slice the coordinating engine instance has performed all requested work on any non-controlling slices for which the coordinating engine instance manages the primary duplicas the non-coordinating engine instances have performed all requested work on the primary duplicas of any other slices that are changed by the transaction, and the log records for all changes made by the transaction to primary duplicas have been successfully propagated to the corresponding secondary duplicas As mentioned previously, a coordinating engine instance may report to a client that a DML operation requested by the client has been successfully performed without waiting for acknowledgement that the log record that corresponds to the DML operation was actually received by the host(s) containing the secondary duplica(s) of the slice that was changed in the DML operation. However, prior to commit, it is necessary for the coordinating engine instance to obtain such acknowledgements. For example, assume that statement ST1 in transaction TX1 requires a change to a row that maps to slice S1. Under these circumstances, engine instance 200B may acknowledge to the client that statement ST1 has been performed after updating primary duplica S1D1 and sending the correspond log record to a NIC of host 200A. However, before committing transaction TX1, engine instance 200B must receive confirmation that the log record was successfully received by host 202A (which hosts the secondary duplica S1D2 of slice S1).

In addition, before committing the transaction TX1, the coordinator engine instance must receive confirmation that all other engine instances that work performed as part of the transaction TX1 are ready to commit. For example, if statement ST2 of TX1 specifies a DML operation on data in slice S3, then coordinating engine instance 200B would have sent a request to engine instance 202B (which manages the primary duplica S3D1 of slice S3) to perform the DML on slice S3.

A non-coordinating engine instance that performs a DML on the primary duplica of a non-controlling slice cannot report to the coordinating engine instance that it is prepared to commit until it receives confirmation that the log records for the changes it made to the non-controlling slice have been successfully propagated to the engine instances that manage the secondary duplicas of the non-controlling slice. In the present example, engine instance 200B sends a statement fragment to engine instance 202B to cause engine instance 202B to perform the requested DML operation for slice S3 on data in S3D1. Under these circumstances, engine instance 202B cannot report that it is prepared to commit until engine instance 202B receives confirmation that the log record that corresponds to its changes to S3D1 have been successfully propagated to S3D2 and S3D3, which are managed by engine instances 208B and 204B, respectively.

Communications During Execution of Statements

Figure 9:
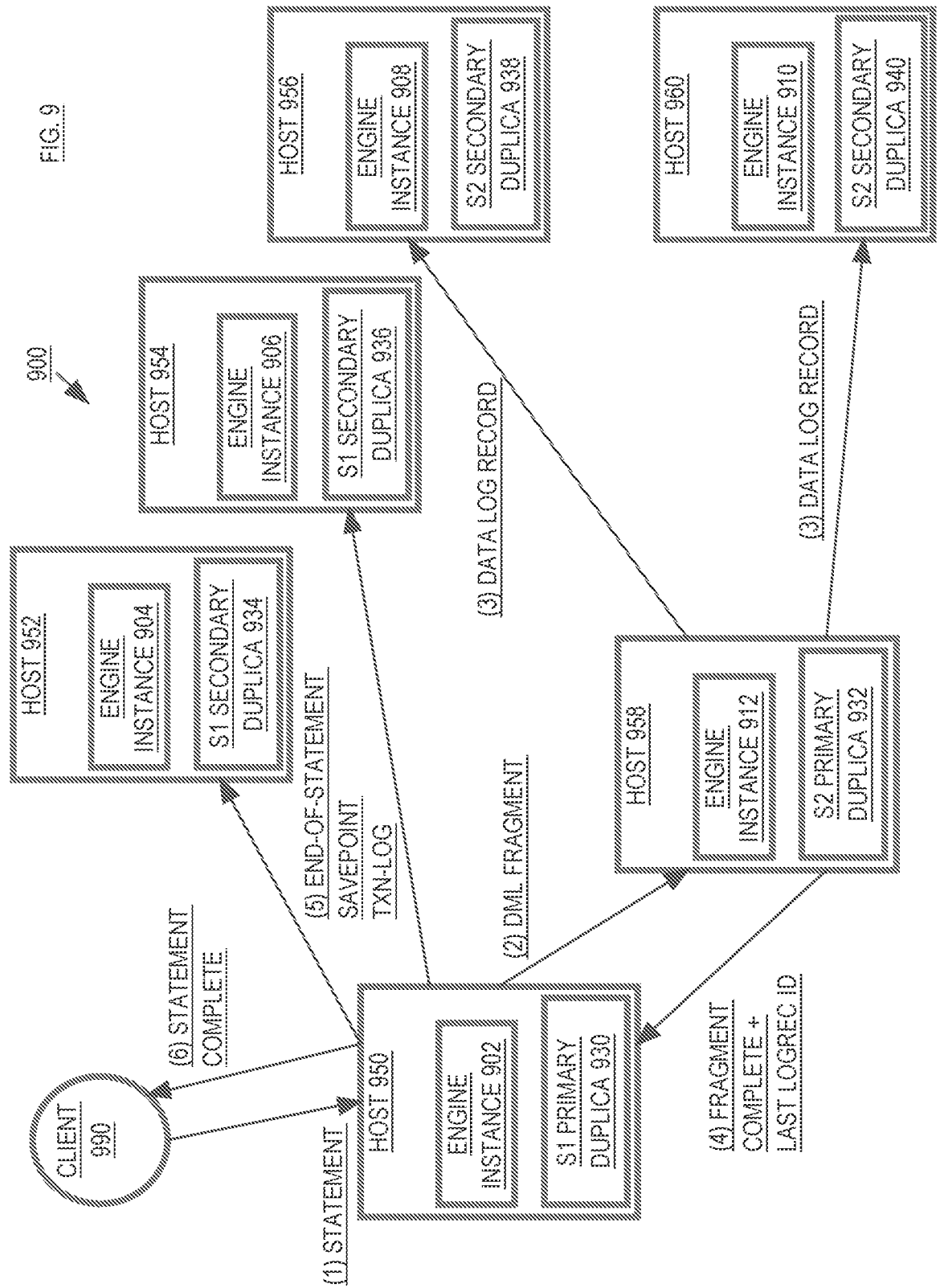
FIG. 9 illustrates the inter-host messages sent during execution of a statement of a database command, according to an embodiment.

Prior to explaining the operations involved in committing a transaction, an explanation shall be given of the various communications that occur during execution of statements within the transaction. Referring to FIG. 9, it is a block diagram of a system 900 that shall be used to explain the transaction commit protocol that may be used by distributed slice-based database systems, according to an embodiment. System 900 includes six hosts 950, 952, 954, 956, 958 and 960. Hosts 950, 952, 954, 956, 958 and 960 are executing engine instances 902, 904, 906, 908, 910 and 912, respectively. Engine instance 902 manages the primary duplica 930 of slice S1, and Engine instance 912 manages the primary duplica 932 of slice S2.

Slice S1 has two secondary duplicas 934 and 936, managed by engine instances 904 and 906, respectively. Slice S2 has two secondary duplicas 938 and 940, managed by engine instances 908 and 910, respectively.

For the purpose of explaining the commit protocol, it shall be assumed that a client 990 submits a transaction TX1 that includes two statement ST1 and ST2, where statement ST1 performs DML on slice S1 and statement ST2 performs DML on slice S2. It shall further be assumed that slice S1 is selected to be the controlling slice of the transaction TX1. Because engine instance 902 manages the primary duplica of the controlling slice S1, engine instance 902 is designated to be the coordinator for the transaction TX1.

Execution of a Statement by the Coordinator

In the present example, execution of statement ST1 by engine instance 902 proceeds by:
  making changes to the primary duplica 930 of slice S1
  semi-synchronously sending the log records for those changes to secondary duplicas 934 and 936 of slice S1
  semi-synchronously sending an end-of-statement savepoint message for statement S1 to secondary duplicas 934 and 936 of slice S1
  sending a statement-complete acknowledgement message for statement S1 to client 990.

Execution of a Statement by a Non-Coordinator

Because statement S2 involves performing a DML operation on a slice whose primary replica is managed at a host other than the host of the controlling engine instance, additional communications are required. The communications required to execute statement ST2 are illustrated in FIG. 9.

Referring to FIG. 9, the submission of statement S2 from client 990 to host 950 is illustrated as "(1) STATEMENT" to indicate that the client's submission of the statement ST2 is the first of the actions illustrated in FIG. 9. According to one embodiment, engine instance 902 includes statement coordinating logic and transaction coordinating logic. If necessary, the statement coordinating logic splits the statement ST2 received from client 990 into statement fragments, where each fragment operates on slices whose primary duplicas are managed by a different host. The statement fragments are then sent to the engine instances that manage the primary duplicas of those slices.

In the present example, statement S2 has only one fragment F1, which indicates the DML to be performed on slice S2. Engine instance 902 sends fragment F1 to engine instance 912 (which manages the primary duplica 932 of S2) for execution. The transmission of fragment F1 to host 958 is illustrated as "(2) DML FRAGMENT" in FIG. 9 to indicate that the transmission of fragment F1 is the second of the actions illustrated in FIG. 9.

The transaction coordinating logic on host 950 keeps track of the state of transaction TX1 and stores transaction log records that indicate the transaction state of transaction TX1 in the primary duplica of the controlling slice. In the present example, the transaction coordinating logic of engine instance 902 stores transaction log records for transaction TX1 in primary duplica 930. As shall be described in greater detail hereafter, these transaction log records (which are distinct from the data log records that contain delta log entries) are propagated to the secondary duplicas 934 and 936 of slice S1 before TX1 is committed.

Because the transaction log records are propagated to the secondary duplicas of the controlling duplica of a transaction, any one of the engine instance(s) that manage those secondary duplica(s) is able to serve as the backup coordinator for the transaction. Thus, as described earlier, if the coordinating engine instance of a transaction fails, one of the backup coordinators is selected to resume the transaction.

After engine instance 912 receives the statement fragment F1, engine instance 912 executes the statement fragment to perform the specified DML operation on data in primary duplica 932 of slice S2. The log record that contains the delta log entry that reflects those changes is then propagated to the secondary duplicas 938 and 940 of slice S2. The propagation of that data log record to hosts 956 and 960 is illustrated as "(3) DATA LOG RECORD" to indicate that the propagation of the data log records is, chronologically, the third action illustrated in FIG. 9. As mentioned above, the propagation of log records is performed in a semi-synchronous manner, where engine instance 912 waits for a local NIC to confirm receipt of the log record for transmission, but does not wait for acknowledgement of receipt of the log record from hosts 956 and 960.

After semi-synchronous transmission of log records to the secondary duplicas 938 and 940 of slice S2, engine instance 912 reports to the coordinating engine instance 902 that fragment execution is complete. In the "fragment complete" message, the engine instance 912 includes information that identifies the last log record that was generated for the changes made by engine instance 912 during execution of the fragment. For example, if the fragment was associated with statement ST2 of the transaction, and execution of the fragment produced three log records, then the fragment complete message may include (a) the statement number ST2, and (b) the log record sequence number (i.e. 3) of the last log record for the statement. The transmission of the "fragment complete" message is illustrated as "(4) FRAGMENT COMPLETE+Last_LOGREC_ID" to indicate that the transmission of the "fragment complete" message is, chronologically, the fourth action illustrated in FIG. 9.

Upon receiving confirmation from all engine instances involved in the execution of a statement that their portion of the statement has been fully executed, the coordinator stores an "end-of-statement savepoint transaction log" to its transaction log and semi-synchronously sends the end-of-statement savepoint transaction log to the backup coordinators (the hosts of the secondary duplicas of the controlling slice).

According to one embodiment, the end-of-statement savepoint transaction log includes:

- the transaction ID of the transaction to which the statement belongs
- the statement number
- a retry number (how many attempts have been made to execute the statement)
- for each slice touched by the statement, a slice-specific record that includes the slice ID and a LogRecID that indicates the sequence number of the last log record with changes this statement made to the specified slice In the present example, upon receiving the fragment-complete message from engine instance 912, engine instance 902 stores an end-of-statement savepoint transaction log and transmits the end-of-statement savepoint transaction log to engine instances 904 and 904, which respectively manage the secondary duplicas 934 and 936 of the controlling slice S1. The semi-synchronous transmission of the end-of-statement savepoint transaction log is illustrated as "(5) END-OF-STATEMENT SAVEPOINT TXN-LOG" in FIG. 9 to indicate that this transmission is, chronologically, the fifth action depicted in FIG. 9.

As mentioned earlier, coordinating engine instances communicate back to the client that a statement has been successfully completed without waiting for acknowledgements that semi-synchronous transmissions relating to the statement actually arrived at their destinations. Thus, upon providing the end-of-statement savepoint transaction log to a NIC for transmission to engine instances 904 and 906, engine instance 902 reports to client 990 that statement S1 was successfully completed.

The Coordinating Engine Instance

At the start of a transaction, the coordinating engine instance (engine instance 902 in the example given above) stores a transaction record for the transaction in a transaction table in the primary duplica of the controlling slice. The transaction record includes the transaction ID of the transaction and status information about the transaction (e.g. whether the transaction is ACTIVE, COMMITTED, ABORTED, etc.). In addition, the transaction entry may also include:

Retry information for statements that have been executed, and
A list of "participating slices" along with their respective "last LogRecIDs"

The list of participating slices is a list of the non-controlling slices that are the target of DML operations in the transaction. In the example given above, slice S1 was the controlling slice, and slice S2 was a participating slice because S2 was updated during the transaction for which slice S1 was the controlling slice. The last LogRecID associated with a participating slice indicates the last LogRecID received by the coordinating engine instance from the engine instance that performed the DML on the participating slice. In the example illustrated in FIG. 9, the LogRecID associated with participating slice S2 is the LogRecID sent by engine instance 912 to host 950 after engine instance 912 completes execution of statement ST2 (i.e. action (4)).

As shall be explained hereafter, the coordinating engine instance uses state information to track statement completion and coordinate the commit protocol. In one embodiment, the state information is maintained within the transaction record of a transaction, which may be in the primary duplica of the controlling slice for the transaction. However, in alternative embodiments, the state information may be stored elsewhere, so long as it is accessible to the coordinator engine instance. How the transaction state information is used by the coordinator engine instance shall be described hereafter with reference to FIG. 10.

Branch Coordinators

When the coordinating engine instance of a transaction sends a statement fragment to cause another engine instance to perform a DML operation, that other engine instance is responsible for coordinating a "branch" of the transaction. In the example illustrated in FIG. 9, engine instance 912 is a "branch coordinator" responsible for coordinating a branch of the transaction TX1 that is being coordinated by engine instance 902.

According to one embodiment, each branch coordinator stores, in a local transaction table, an entry that indicates:

a local-transaction-ID-to-global-transaction-ID mapping
the state of the local branch of the transaction (ACTIVE, COMMITTED, ABORTED, etc.)
timestamp information These "branch transaction entries" are propagated, using semi-synchronous propagation, to the secondary duplicas of the primary duplica that was updated during execution of the branch. For example, during execution of the branch by engine instance 912, engine instance 912 performed a DML operation on the primary duplica 932 of slice S2. Consequently, the branch transaction entry for the branch is propagated, using semi-synchronous propagation, to the secondary duplicas 938 and 940 of slice S2.

Transactions can see their own uncommitted changes. However, transactions can only see the committed changes of other transactions. Further, transactions can only see those changes by other transactions if the commit time of the changes is on or before their snapshot time. The transaction state information, in combination with the timestamp information, allows reads to be performed at the secondary duplicas. For example, assume that a client sends host 956 a request to read data from slice S2 as of a snapshot time T10. Engine instance 908 inspects the transaction state information to determine whether the change made to slice S2 during the transaction branch has been committed. If the change made to slice S2 has been committed, then engine instance 908 inspects the timestamp information to determine whether the changes made in the transaction branch fall within the T10 snapshot. If the changes are either uncommitted or too recent (i.e. the commit time of the branch is greater than T10), then engine instance 908 skips the entries, in the chronological entry chains, that are associated with the changes made during the transaction branch, to locate older entries that contain data that does fall within the T10 snapshot.

Updating Logical Clocks

It is critical that the commit times of two transactions that updated the same data item reflect the order in which the changes were made to that data item. Thus, if TX1 updates a data item and commits, and TX2 then updates the same data item and commits, then TX2 must be assigned a later timestamp than TX1, even if TX2 being coordinated by a different host than the host that coordinated TX1.

In order to ensure no transaction is given a commit timestamp that is earlier than later transactions that touch the same data items, the hosts piggyback the current values of their logical clocks on messages that are sent to other hosts. For example, according to one embodiment, the prepare acknowledge messages sent by all participants in a transaction back to the coordinating engine instance include the current values of the logical clocks of their respective hosts.

All nodes that were involved in a transaction must report back their logical clock values to the coordinator engine instance to ensure that the transaction is assigned a commit time that is later than logical clocks of the participating nodes at the time they were involved in the transaction. Specifically, the nodes that have to report their clock values back to the coordinator engine instance include the nodes of (a) all primary duplicas touched by the transaction, and (b) all secondary duplicas of the primary duplicas that were touched by the transaction. As shall be described in greater detail hereafter, the prepare acknowledge message sent from backup coordinator engine instance 904 would include the current value of the logical clock of host 952. The prepare acknowledge message sent from backup coordinator engine instance 906 would include the current value of the logical clock of host 954. The prepare acknowledge message sent from branch coordinator engine instance 912 would include the current value of the logical clock of host 958.

If any of the prepare acknowledge messages includes a logical timestamp that is greater than the current value of the logical clock on the host of the coordinating engine instance (e.g. host 950), then the logical clock of the host of the coordinating engine instance is updated to reflect a time that is greater than the highest logical clock value it received. For example, assume that the current value of the logical clock on host 950 is T500. In this case, if the prepare acknowledge messages from engine instances 904, 906 and 912 contained the timestamps T300, T400, and T600, respectively, then the logical clock on host 950 would be updated to at least T601. This clock adjustment is performed before the coordinating engine instance uses the logical clock on host 950 to obtain a candidate commit time from transaction TX1.

Committing a Transaction

Figure 10:
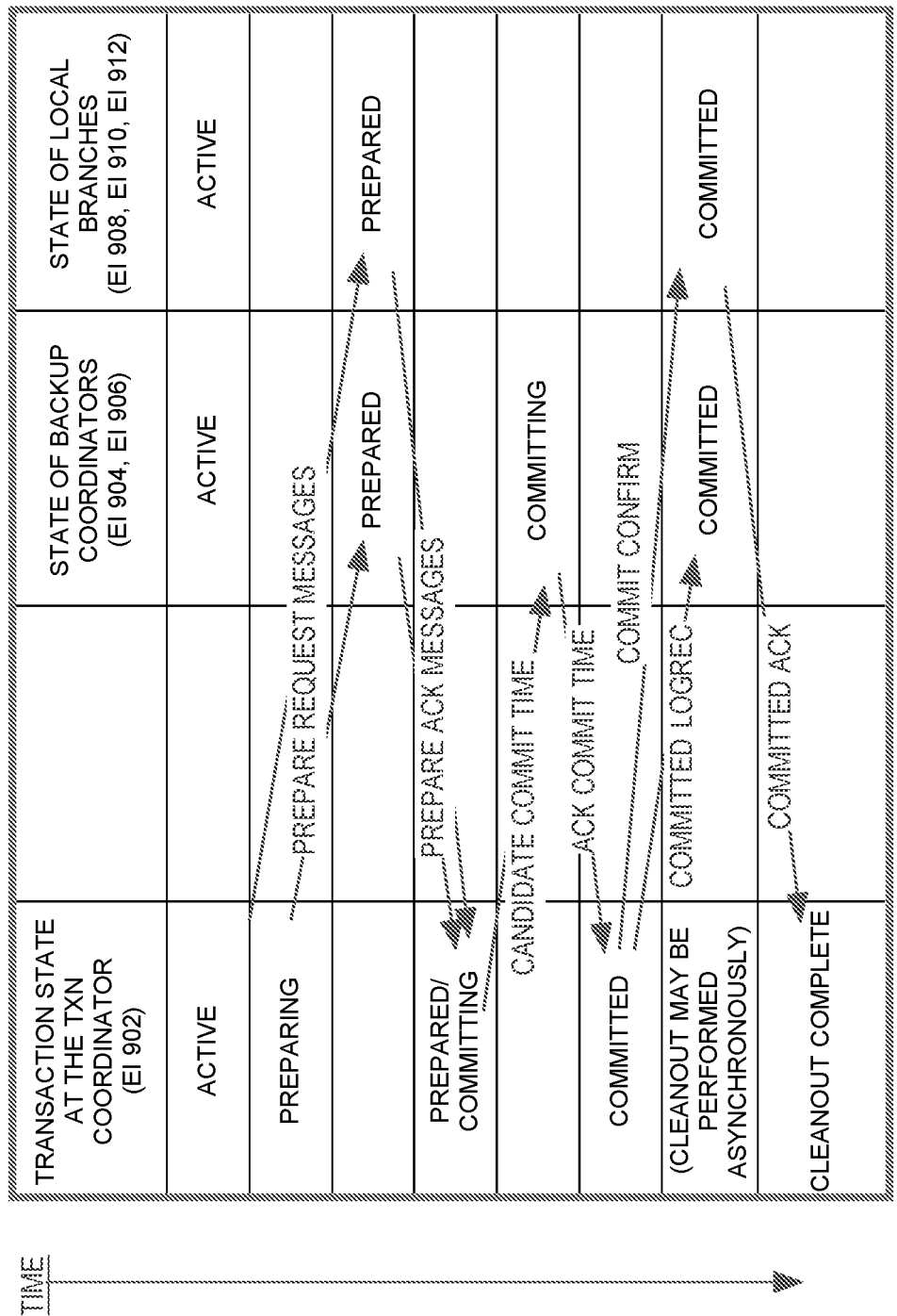
FIG. 10 illustrates the inter-host messages sent during commit of a transaction, according to an embodiment.

Referring to FIG. 10, it illustrates a protocol for committing transaction TX1 after the actions illustrated in FIG. 9 have been performed. Initially, while the statements of the transaction are being executed, the state of the transaction is active. The "active" status of the transaction is reflected in the transaction log records maintained by the coordinating engine instance (e.g. engine instance 902), the backup coordinators (e.g. engine instances 904 and 906) and the branch coordinators (e.g. engine instance 912).

After all statements in the transaction have been performed, the client submits a commit command. At the time the commit command is received, the coordinating engine instance 902 has received confirmation that all of the statements (ST1 and ST2) of TX1 have been performed, the coordinating engine instance 902 has updated the transaction record for TX1 accordingly, and has semi-synchronously sent the transaction record to the secondary duplicas 934 and 936 of the controlling slice S1. Engine instance 902 has also reported to client that statements S1 and S2 have been fully executed (along with the last LogRecID for each statement).

In response to the commit command, the coordinating engine instance transitions to a "preparing" state by:
 updating the state information in its transaction record for TX1, and
 sending prepare request messages to all engine instances that participated in the transaction, including the backup coordinators, the branch coordinators (which host primary duplicas that were touched by the transaction) and the hosts of all secondary duplicas of all slices that were touched by the transaction.

To send prepare request messages to the participants in the transaction, the coordinating engine instance reads the list of participants from the transaction record of the transaction. According to an embodiment, the coordinating engine instance also obtains a "prepare timestamp" for the transaction. The prepare timestamp for the transaction may be the current value of the logical clock of the host on which the coordinating engine instance resides.

According to an embodiment, the prepare request messages include:
 the global transaction ID of the transaction being prepared
 the prepare timestamp
 the slice ID for each slice touched by the transaction
 for each slice touched by the transaction, the last LogRecID of the log records associated with changes made by the transaction to that slice.

In response to receiving the prepare request messages, the participants in the transaction:
 update their local logical clock to the global prepare timestamp if the global prepare timestamp is greater than the current value of the local logical clock
 use the last LogRecIDs in the prepare request message to confirm that they possess all of the log records that the coordinating engine instance thinks they should have
 obtain a local prepare timestamp from their local logical clock With respect to checking whether all needed log records exist, assume that a participating engine instance has a duplica of slice S1. Assume further that the changes made by the transaction to slice S1 were reflected in three data log records DL1, DL2 and DL3. In this example, the prepare request message sent to engine instance 912 includes, for slice S1, the last LogRecID of DL3. In response to receiving the prepare request message from the coordinating engine instance 902, the participating engine instance verifies that it has the log records for slice S1 up to and including log record DL3. How errors are handled (e.g. the participating engine instance is missing a log record) shall be described in greater detail hereafter.

Upon confirming that they have the required log records, the transaction participants obtain a local prepare timestamp and update the status information in their respective transaction records to indicate the local prepare timestamp and that the transaction TX1 is in the "prepared" state. After updating their respective transaction records, the transaction participants send prepare acknowledgement messages to the coordinating engine instance. According to one embodiment, each prepare acknowledgement message includes the local prepare timestamp. This timestamp value represents the local "prepare time" of the transaction. As shall be described in greater detail hereafter, the coordinating engine instance uses these local prepare times to ensure that that commit time of the transaction TX1 is greater than all of the local prepare times.

Upon receiving prepare acknowledgement messages from all transaction participants, the coordinating engine instance:
 updates its local logical clock to a value that is greater than the highest local prepare time (if any local prepare time is greater than the current time of the coordinating engine instance's logical clock)
 obtains a candidate commit time based on the current value of its local logical clock
 updates its transaction record with the candidate commit time and with an indication that the transaction is in a "prepared/committing" state, and
 sends a message containing a candidate commit time to each of the backup coordinators.

According to one embodiment, the "candidate commit time" sent by the coordinating engine instance to the backup coordinators is obtained by incrementing the value of the coordinating engine instance's logical clock, and then using the new value of coordinator's logical clock as the candidate commit time. Stated another way, the candidate commit time is set to max(local prepared times, current local clock)+1.

In the present example, the logical clock on host 950 is incremented and then its value is sent to engine instances 904 and 906 as the candidate commit time of TX1. Because this occurs after that logical clock has been updated based on the local prepare times at all hosts involved in the transaction, the candidate commit time is guaranteed to be higher than the prepare times of all participates in the transaction.

In response to the message containing the candidate commit time, the backup coordinators update their transaction log with the candidate commit time and an indication that the transaction is in the "prepared/committing" state. The backup coordinators then send "acknowledge commit time" messages back to the coordinating engine instance.

Upon receiving acknowledge commit time messages from all backup coordinators, the coordinating engine instance:
  changes the state of the transaction to "committed",
  tells the client the that transaction has committed (and provides the commit time),
  sends the committed transaction record to the backup coordinators In response to receiving the committed log record of the transaction, the backup coordinators update their transaction log record for the transaction to reflect that the transaction is committed.

After the transaction is committed, commit confirm messages are sent (asynchronously) to all participants in the transaction. In response to the commit confirm messages, cleanout is performed on all entries (delta log records and/or row heap entries) that correspond to the transaction. After cleanout, the participants of the transaction send commit acknowledgement messages back to the coordinating engine instance.

Reporting that a Transaction Committed

In the commit protocol described above, the coordinating engine instance does not tell the client that the transaction is committed until the coordinating engine instance receives acknowledge commit time messages from the backup coordinators. The reason that the coordinating engine instance waits to report the commit of the transaction until the receiving the acknowledge commit time messages from the backup coordinators is because, under certain circumstances, the commit time of the transaction will change from the candidate commit time that is initially set by the coordinating engine instance.

For example, assume that the transaction is initially assigned a candidate commit time of T121. Assume further that the coordinating engine instance (e.g. engine instance 902) marks the transaction as "committed" as of time T121 before receiving the commit time acknowledgements from the backup coordinators (e.g. engine instances 904 and 906). At this point, a read operation with a snapshot time of T125 will see the changes made by the transaction.

However, the coordinating engine instance may crash at time T130, before the coordinating engine instance has received commit time acknowledgements from the backup coordinators. Under these circumstances, a backup coordinator (e.g. engine instance 904) may be assigned to be the new coordinating engine instance for the transaction.

The new coordinating engine instance, which may have no knowledge of the candidate commit time of T121:
  re-prepares the transaction for commit (confirming that all participants are prepared to commit the transaction),
  selects a new candidate commit time (e.g. T135)
  sends the candidate commit time to the backup coordinators
  when acknowledgements are received, communicates the new commit time to the client.

Because the transaction now has a commit time T135 that is greater than T125, the read operation that was performed before the crash of the coordinating engine instance (which used snapshot time 125) is not repeatable. Specifically, executing the same read operation with the same snapshot time will produce results that do not include the changes made by the transaction (because the new commit time is after the snapshot time of the read operation).

Blackout Ranges for Resumed Transactions

According to one embodiment, the commit protocol is modified such that the coordinating transaction reports to the client that the transaction committed when the candidate commit time message are "on-the-wire" without waiting to receive acknowledgements of the commit time messages from the backup coordinators. To avoid the non-repeatable-read-operation problem caused when such transactions are resumed by backup coordinators that did not receive the original candidate commit time, such transaction-resuming backup coordinators assign a "blackout range" for the transaction.

According to one embodiment, the blackout range for a transaction that is resumed by a backup coordinator is the time period between (a) the highest prepare time for the transaction and (b) the commit time assigned to the transaction by the resuming backup coordinator. In the example given above, assume that the highest prepare time received by the original coordinating engine instance 902 is T124. Consequently, coordinating engine instance 902 selects a commit time of T125. Coordinating engine instance 902 reports that transaction TX1 has committed (before receiving acknowledgements of the commit time from the backup coordinators 904 and 906), and then crashes.

Backup coordinator engine instance 904 may then be selected to resume transaction TX1. Engine instance 904, which is the new coordinator, re-prepares the transaction. The highest prepare time received by engine instance 904 will once again be T124. However, the internal logical clock at engine instance 904 may be T134. Thus, engine instance 904 may assign transaction TX1 a commit time of T135. In this example, the "blackout range" for the resumed transaction TX1 is the time range between but excluding T124 (the highest prepare time) and T135 (the commit time of the resumed transaction).

After a blackout range has been assigned to a resumed transaction that has been committed, the system reports an error if a read operation with a snapshot time within the blackout range attempts to read data items that were touched by the resumed transaction. For example, after transaction TX1 is committed with a commit time of T135 and a blackout range of T125-134, errors will be generated if any read operation with a snapshot time in the range T125-T134 attempts to read a row that was touched by transaction TX1. In response to receiving such an error, a client may resubmit the read operation with a snapshot time that falls outside the blackout range (e.g. a read snapshot time of T157).

Atomically Changing State and Timestamp Information

It is often necessary to make multiple changes atomically (so that processes either see all of the changes, or none of the changes). For example, after obtaining a candidate commit time, the coordinating engine instance must change, within the transaction record, the state of the transaction to "committing" and the timestamp to the candidate commit time. It is important that no process sees one of these changes without seeing the other.

According to an embodiment, if the hardware does not support making these two changes atomically, the atomicity may be achieved by (a) storing an invalid timestamp in the transaction record, (b) changing the state information in the transaction record, and (c) storing the candidate commit time over the invalid timestamp in the transaction record. Using this technique, a process that is reading the transaction record will either see:

state=prepared, timestamp=prepared timestamp
state=prepared, timestamp=invalid timestamp
state=committing, timestamp=invalid timestamp
state=committing, timestamp=candidate commit timestamp In the cases where the reading process sees an invalid timestamp (e.g. a timestamp of 0), the reading process knows that the transaction record is being updated, so the reading process does not use the information. Instead, the reading process waits until it sees a timestamp that is valid, at which time the process will see the "candidate commit timestamp" and that the state is "committing".

Lanes and Auto-Commit Transactions

In the example given above, the commit protocol is initiated when a commit command is received from the client. However, in the case of an auto-commit transaction, the commit command may be implicit. According to one embodiment, a configuration parameter for a "lane" between a client and a host is set to "auto-commit". A "lane" is a logical entity that connects a client to a host that ensures ordering of the statements submitted through the lane. Thus, a lane may be considered a "pipe" through which a client sends commands to a host.

If a configuration parameter of a lane is set to auto-commit, then every statement received through that lane is treated as a single-statement transaction. Thus, after receiving confirmation that the operations specified in a statement from that lane have been made, the coordinating engine instance automatically initiates the commit protocol, even though no explicit commit command was received.

While a lane is a pipe that is initially established between a client and a host, lanes may be considered client-side entities in that a client associated with a lane does not change, but the host associated with a lane can change. For example, when a transaction fails over from one host to another, the lane through which the client submitted commands for the transaction is connected to the new host, and the client continues to use that same lane to submit commands to the new host for the resumed transaction.

Eager Prepare

According to one embodiment, for auto-commit transactions, it is possible to piggyback the messages normally sent during the prepare phase of the transaction on messages sent during the active phase of the transaction. For example, transmission of the data log record containing the changes made by a transaction can be combined with transmission of prepare request messages. Under these circumstances, the "prepare request message" may simply be a flag in the data log record. When the flag is set, the recipient knows to prepare the changes made by the transaction and piggyback a prepare timestamp on its acknowledgement message for the received data log record.

Referring again to FIG. 9, assume that an auto-commit transaction specifies a change to data in slice S1. S1 is selected as the controlling slice, and engine instance 902 is therefore selected as the coordinating engine instance. After making the change to the primary duplica 930 of S1, engine instance 902 sends a data log record containing those changes to hosts 952 and 954 which respectively store secondary duplicas 934 and 936 of slice S1. With eager prepare, the message that includes that data log record additionally serves as the prepare request message. Thus, hosts 952 and 954 would respond to the message by determining a prepare time for the transaction, and sending back to engine instance 902 an acknowledgement that not only indicates that the data log record was received, but also includes their respective prepare times for the transaction. Based on the prepare times, engine instance 902 selects a candidate commit time and proceeds with the steps for committing the transaction (illustrated in FIG. 10). Thus, the need for a separate "preparing" phase is avoided. If the auto-commit transaction changes data in two slices (e.g. S1 and S2), then the engine instances responsible for the primary duplicas of those slices would make their respective changes and send their respective log records to the appropriate secondary duplicas. All secondary duplicas would tread the data log record as a prepare request message, and respond with prepare times for the transaction.

For transactions that are not auto-commit, it may be inefficient to eagerly prepare the transaction. For example, if a transaction includes 20 statements, it would be inefficient to request participants to "prepare" after each of the 20 statements. If a participant indicates that the transaction is prepared after the first of the 20 statements, then from that point on, read operations that target the data touched by the transaction will have to treat the transaction as being in the prepared state, rather than being in an active state. As explained in greater detail below, read operations for data that is in a prepared state may require additional steps (when the snapshot time of the read is greater than the prepared timestamp) to increase the likelihood that the transaction will ultimately be assigned a commit time that is greater than the snapshot time of the read operation.

In the case where the number of statements in a non-auto-commit transaction is known or can be accurately estimated, it may still be worthwhile to eagerly prepare the transaction. In such cases, combining the data log record message with the prepare request message would only be performed for what is known or estimated to be the last log record of the final statement in the transaction. For example, in a transaction with 20 statements, the prepare request message may be combined with the data log record message of the last log record for changes made by the $20^{th}$ statement.

In the case where the work for the last statement is to be performed by a non-coordinating engine instance, the coordinating engine instance combines the prepare request message with the DML, fragment sent to the non-coordinating engine instance. For example, referring again to FIG. 9, assume that engine instance 902 is coordinating a transaction where the last statement operates on slice S2. Under these circumstances, the DML fragment sent from engine instance 902 is combined with a prepare request message. After executing the DML fragment, engine instance 912 includes prepare request messages in the data log records sent to the secondary duplicas 938 and 940 of slice S2. In this example, engine instances 908 and 910 not only acknowledge receipt of the log records, but (a) confirm that they are prepared to commit the transaction and (b) include their local prepare timestamp in the acknowledgement. Upon receipt of those acknowledgement messages, engine instance 912 updates its local logical clock, obtains its own prepare time for the transaction, and acknowledges to the coordinating engine instance 902 that it is prepared to commit. In this context, "updating a local logical clock" involves setting its logical clock to the greater of (a) its current value, and (b) the local prepare timestamp. In its acknowledgement message to engine instance 902, engine instance 912 includes its prepare timestamp.

According to one embodiment, when a message that would normally be sent asynchronously is combined with a prepare request, the message is instead sent synchronously. For example, engine instance 912 does not report to engine instance 902 that it successfully executed its DML fragment until it receives acknowledgments and prepare timestamps from the secondary duplicas 938 and 940.

Any transaction participants that did not receive an "eager prepare" message must be sent a prepare message, as explained above, during the preparing phase of the transaction. On the other hand, if eager prepare messages (prepare request messages piggybacked on other messages, such as log records) were sent to all participants, then there is no separate prepare phase. Under these circumstances, when the commit instruction is received, the coordinating engine instance will already have the prepare times of all the participants. At that point, the coordinating engine instance selects a candidate commit time and proceeds to the committing phase, as described above.

Eager Prepare of Auto-Commit Touching Two Slices

Eager prepare may be used even for auto-commit transactions that touch data in more than one slice. For example, assume that an auto-commit transaction touches slices S1 and S2 in the system illustrated in FIG. 9. Assume further that slice S1 is selected as the controlling slice. Because slice S1 is selected as the controlling slice, engine instance 902 is designated the coordinating engine instance. Engine instance 902 executes the portion of the transaction that touches slice S1, and sends a DML fragment to engine instance 912 to cause engine instance 912 to perform the portion of the transaction that touches slice S2. Engine instance 902 piggybacks a prepare request message on the DML fragment sent to engine instance 912.

Engine instance 902 sends one or more log records to secondary duplicas 934 and 936 so the secondary duplicas will reflect the changes made by engine instance 902 to the primary duplica 930 of S1. The last of those log records to each of the secondary duplicas is sent synchronously and includes a prepare request.

Similarly, engine instance 912 sends one or more log records to secondary duplicas 938 and 940 so the secondary duplicas will reflect the changes made by engine instance 912 to the primary duplica 932 of S2. The last of those log records to each of the secondary duplicas is sent synchronously and includes a prepare request.

Engine instances 904 and 906 respond to the data log records/prepare requests from engine instance 902 by obtaining prepare timestamps and sending the prepare timestamps to engine instance 902. Similarly, engine instances 908 and 910 respond to the data log records/prepare requests from engine instance 912 by obtaining prepare timestamps and sending the prepare timestamps to engine instance 912. Engine instance 912 then increases its clock, as needed, and obtains a prepare timestamp. Engine instance 912 piggybacks its prepare timestamp on the message that acknowledges execution of the DML fragment.

At this point, the coordinating engine instance 902 has received, directly or indirectly, prepare timestamps from all participants in the transaction. Coordinating engine instance 902 increases is current clock as necessary based on those prepare timestamps, and determines a candidate commit time. Coordinating engine instance 902 may then proceed directly to the commit phase of the transaction.

Downgrade from Prepared State

When eager prepare is used, the transaction is treated as "prepared" by each engine instance that has received a piggybacked prepare request message. Because with eager prepare, the prepare request messages are combined with messages that are sent before the transaction as a whole is ready to be committed, the read operations that are received in the meantime may be handled in an inefficient manner. That is, they cannot safely ignore the uncommitted changes as they could safely do if the transaction were not yet in the prepared state. According to one embodiment, the system tracks how many read operations attempt to read data touched by a transaction that has been eagerly prepared. If the number of read operations exceeds a threshold, then the transaction automatically transitions from eager-prepare to no-eager-prepare. In response to the transition, the participants in the transaction that have eagerly prepared change the transaction state back to "active". In addition, the coordinating engine instance discards the prepare times that have been provided by the participants.

As a result of the transaction state returning to "active", new read operations can access older versions of the data items touched by the transaction based on the assumption that the transaction will be assigned a commit time that is greater than their snapshot time. Thus, special handling is avoided for situations where their snapshot time is greater than the prepare time. Any transaction that transitions from eager-prepare to no-eager-prepare must undergo a full prepare phase after the last statement of the transaction has been executed, as illustrated in FIG. 10.

Reading Data Items Updated by Transactions that have not Yet Committed

The fact that a data item has been updated by a transaction that has not yet committed does not necessarily halt the progress of a read operation that targets that data item. For example, assume that the chronological entry chain for a row R1 in slice S1 has ten entries, where the first five entries are associated with a transaction that has not committed. Assume further that a client submits a request to read row R1 as of time T20. As explained above, any duplica of slice S1 may be used to service the read operation. How the read operation proceeds depends on the status of the not-yet-committed transaction.

If the not-yet-committed transaction is still "active", then the first five entries may be skipped, and the row version of R1 that corresponds to time T20 may be obtained from one or more of the older five entries for the row. In this case, it is safe to assume that the read operation need not see any changes made by the not-yet-committed transaction because that transaction is guaranteed to be assigned a commit time greater than the read operation's snapshot time of T20.

If the not-yet-committed transaction is in the "prepared" stage and the prepared timestamp is greater than T20, then the first five entries may be skipped and the row version that corresponds to time T20 may be obtained from one or more of the older five entries for the row. In this case, it is safe to assume that the read operation need not see any changes made by the not-yet-committed transaction because that transaction is guaranteed to be assigned a commit time greater than the prepare time, which is known to be greater than the snapshot time T20.

On the other hand, if the not-yet-committed transaction is in the prepared phase and the prepared timestamp is less than T20, it is possible that the not-yet-committed transaction will be assigned a commit time less than T20. For example, assume that the read operation is to read a row of slice S2 from the secondary duplica 938 of S2. If the transaction is in the prepared state and the prepared time is T15, then engine instance 908 would have already sent a prepare acknowledge message with the prepare time of T15 to the coordinating engine instance 902. Thus, the commit time of the transaction is guaranteed to be greater than T15, but not guaranteed to be greater than T20. Under these circumstances, the read operation may be halted until a commit time is assigned to the transaction. In some situations, the read operation may be halted until cleanout of the entries generated by the transaction, because the coordinator of the read operation will not know the commit time of the transaction until cleanout, on the host executing the read operation, of the entries generated for the transaction.

If the commit time is greater than T20, the read operation may proceed by skipping the five entries generated by the transaction. On the other hand, if the commit time is less than T20, then changes made by the transaction must be seen by the read operation, so values in those first five entries are used as needed to obtain the data needed by the read operation.

A transaction in a "prepared/committing" state is handled similar to a "prepared" transaction. Specifically, if a read operation has a snapshot time that is lower than the committing timestamp, then the read operation may be performed by skipping the entries of the chronological entry chain of a row that are associated with the committing transaction, because the committing transaction is guaranteed to have a snapshot time at least as high as the committing timestamp. On the other hand, if the committing timestamp is less than the snapshot time of the read operation, then the read operation must wait until the transaction has been assigned a commit time.

Optimization for Prepare-Time Read Operations

As mentioned above, read operations that have snapshot times greater than the prepared time of a transaction that has updated an item they must read normally have to wait until that transaction commits and is assigned a commit time. Once the transaction has committed and the commit time is assigned, if the commit time is greater than the snapshot time of the read operation, changes made by the transaction are skipped. On the other hand, if the commit time is less than the snapshot time of the read operation, then the read operation sees the changes made by the transaction.

According to one embodiment, a technique is employed to avoid making a read operation that needs to see a particular version of a particular data item wait during the prepared phase of a transaction that performed DML on the particular data item. Specifically, when (read snapshot time>TXN prepared time), the engine instance that is executing the read operation sends an increase-clock message to the host that is executing the coordinating engine instance. The increase-clock message may be sent immediately, or after a short wait.

The increase-clock message includes the snapshot time of the read operation. If the logical clock at the coordinating host is not already higher than the snapshot time in the increase-clock message, then the host that receives the increase-clock message responds to the increase-clock message by increasing the value of its logical clock to a value higher than the snapshot time contained in the message. Upon receipt of an acknowledgement that the host of the transaction has increased its logical clock, the read operation may proceed under the assumption that the changes made by the transaction do not belong to the read operation's snapshot, and therefore can be safely skipped by the read operation. At this point, the prepare time at the duplica can also be increased to the snapshot time of the read operation (since, now that the coordinating engine instance's clock has been maxed with the snapshot time of the read operation, the transaction is guaranteed to be assigned a commit time higher than the snapshot time).

For example, assume that TX1 updated a particular row in slice S2, the status of TX1 at secondary duplica 938 is "preparing", and the prepare time for TX1 at secondary duplica 938 is T10. Assume further that engine instance 908 receives a request to read that particular row as of time T20. Under these circumstances, rather than wait for TX1 to commit, engine instance 908 may send an increase-clock message with timestamp T20 (or higher) to host 950. In response, host 950 increases the value of its local logical clock to a time later than the timestamp included in the increase-clock message. Increasing the clock of host 950 in this manner ensures that host 950 will assign a commit time to TX1 that is higher than the read operation's snapshot time of T20. Host 950 sends an acknowledge increase-clock message back to host 956. After receiving the acknowledgement of the increase-clock message, the prepare time may be increased to T20, and the read operation may proceed, skipping the entries associated with TX1 because the changes made by TX1 are guaranteed to not be in the snapshot associated with time T20.

According to one embodiment, the increase-clock operation is accomplished using a series of Remote Direct Memory Access (RDMA) calls. An RDMA call may be made to read the relevant transaction table entry at the host on which the coordinating engine instance is running. From the transaction table entry, the coordinator of the read operation may obtain the global prepare time for the transaction. If read operation snapshot is less, then the change can safely be ignored because the commit time will only go up. If the read operation snapshot is greater than the global prepare time, then an RDMA write operation may be used to change the global prepare time to the read operation's snapshot time. Changing the global prepare time in this manner ensures that the coordinating engine instance of the transaction will ultimately assign the transaction a commit time that is higher than the read operation's snapshot time.

Handling Committing-Time Read Operations

As explained above, read operations that arrive during a transaction's preparing phase may proceed to read older versions of data items that were touched by the transaction after ensuring that the transaction will be assigned a commit time that is greater than the snapshot time of the read operations. Unfortunately, a similar optimization cannot be performed for read operations when the transaction at issue is in the prepared/committing state.

When the transaction is in the prepared/committing state, the coordinator of the transaction has already sent a candidate commit time to the backup coordinators. Thus, increasing the logical clock of the host of the coordinating engine instance at that time, based on the snapshot time of the read operation, may not have any effect on the commit time assigned to the transaction. Similarly, changing the prepare time of the transaction in the global transaction table entry will change the candidate commit time that the coordinating engine instance has already sent out to the backup coordinators.

According to one embodiment, the coordinator of a read operation may still send an increase-clock message to the coordinating engine instance when the transaction is in the "prepared/committing" state. However, rather than adjust its clock or change the global prepare time, the coordinating engine instance waits until it has received the acknowledge commit time messages from the backup coordinators. At that point, the coordinating engine instance not only changes the transaction state to "committed", but also responds to the held-up read operations by providing the commit time assigned to the transaction.

Because the commit time is sent directly to the coordinator of the read operation, the read operation is only held up until transaction commit, rather than the cleanout time of the data log entries at issue. By comparing the commit time of the transaction to the snapshot time of the read operation, the coordinator of the read operation determines whether to obtain data from or skip the chronological entry chain entries that were generated for the transaction.

According to one embodiment, when the transaction is in the prepared/committing phase and a read operation is held up, the coordinating engine instance may send the candidate commit time of the transaction to the coordinator of the held-up reading operation. This candidate commit time may be sent without the coordinating engine instance waiting for all backup coordinators to acknowledge the commit time. Under these circumstances, if the candidate commit time is less than the snapshot time of the read operation, then the read operation must continue to wait (because it is not yet guaranteed that the transaction will commit). On the other hand, if the candidate commit time is greater than the snapshot time of the read operation, the read operation may proceed under the assumption that it cannot see the changes made by the transaction. This is possible because if the transaction does commit, it will have a commit time at least as high as the candidate commit time.

Optimistic Prepare Times

As explained above and illustrated in FIG. 10, upon receiving prepare acknowledgement messages from all participants in a transaction, the coordinating engine instance selects a candidate commit time that is higher than (a) its current logical clock, and (b) the highest prepare times received from the transaction participants. In the embodiment described above, the prepare time sent by each transaction participants is the value of the logical clock at the participant's host when the participant prepared the changes associated with the transaction.

For example, if transaction TX1 performed DML on slices S1 and S2 in the system 900 illustrated in FIG. 9, then all hosts in system 900 would be participants in TX1 because each of the hosts has a duplica of either slice S1 or slice S2. Since the logical clocks at these hosts are independent of each other, the prepare times established at each of the hosts for transaction TX1 may differ.

As mentioned above, read operations that target data items touched by TX1 during the preparing phase of TX1 must perform additional work before reading the data items (e.g. send clock-increase messages to the controlling engine instance) if their snapshot times are greater than the prepare time of TX1. However, if their snapshot times are less than the prepare time of TX1, that additional work is not necessary.

According to one embodiment, to increase the likelihood that the snapshot times of later-received read operations will be less than the prepare time of a transaction being prepared, the transaction's participants may assign the transaction a prepare time that is higher than its current clock. For example, assume that engine instance 910 has received a prepare request for TX1. In response, engine instance 910 verifies that secondary duplica 940 of S2 has the log records for all changes TX1 made to slice S2. Engine instance 910 then changes its locally-stored status of TX1 to "prepared", stores the local prepared time for TX1, and returns the local prepared time in a prepare acknowledge message. To assign an optimistic prepare time, engine instance 910 selects a prepare time that is significantly higher than the current value of the logical clock of host 960.

For example, if the current value of the logical clock of host 960 is T1000, engine instance 910 may select a prepare time of T10,000. By selecting an optimistic prepare time in this manner, engine instance 910 increases the likelihood that any read operation that targets data items touched by TX1 that are received during the preparing state of TX1 will have snapshot times that are less than the local prepare time of TX1. Because those read operations will have snapshot times lower than the local prepare time of TX1, the read operations may proceed (seeing the pre-TX1 version of the data items) without having to perform any additional work to ensure that TX1 will be assigned a commit time that is greater than the read operation's snapshot time.

Logical Rollback of Log Records

Under various circumstances, it is necessary to "roll back" or "undo" changes that have been made to a slice. According to an embodiment, rather than creating a new version of data in which the changes have been removed, the system simply stores data indicating which log records are to be treated as "undone".

For example, assume that a statement ST3 makes changes to multiple slices whose primary replicas are spread across multiple hosts. During execution of the statement, log records for the statement ST3 are generated by each of those hosts. Each of those log records is tagged with an identifier for statement ST3. If the coordinating engine instance fails before execution of the statement ST3 has completed, the transaction fails over to another engine instance that becomes the new coordinating engine instance for the transaction. To undo the changes that were made for statement ST3, the new coordinating engine instance generates a "rollback log record". The rollback log record indicates that all log records tagged with the statement number ST3 of the transaction are to be treated as "undone".

After storing the rollback log record, the new coordinating engine instance resubmits the statement for execution. However, rather that reusing the same statement number, the new coordinating engine assigns a new statement number (e.g. ST4) to the statement. Because a new statement number is used for the re-executed statement, the log records for the aborted execution of the statement may be readily distinguished from the log records generated when the statement is re-executed.

When delta log entries are applied to the row heap, delta log entries in an "undone" log record are skipped. Thus, applying such log records involves removing the delta log entries from their respective chronological entry chains without creating any new heap row entries. After the undone delta log entries have been removed from their chronological entry chains, the space allocated to the undone log record in the delta log can be deallocated/reused.

Recovering from a Lost Data Log Record

During the execution of a transaction, numerous different types of failures can occur. One such error is the failure of a secondary duplica to receive a data log record that reflects a change made to the primary duplica. When that error is discovered depends on a variety of factors, such as whether the host containing the primary duplica fails.

Referring again to FIG. 9, assume engine instance 912 generates three data log records (DL1, DL2 and DL3) during execution of the DML fragment associated with statement ST2 of transaction TX1. Assume further that hosts 960 and 956 of the secondary duplicas 940 and 938 of S2 do not receive the data log record DL2.

If hosts 960 and 956 receive a subsequent data log record (e.g. DL3) without receiving DL2, then hosts 960 and 956 are able to tell that they are missing a data log record. Under these conditions, hosts 960 and 956 may request the missing log record (DL2) from host 958.

In some cases, a failure may not be discovered until later in transaction execution. For example, assume that hosts 956 and 960 receive log records DL1 and DL2, but fail to receive the log record DL3, which was sent semi-synchronously from host 958. Assume further that host 958 acknowledged completion of the statement fragment to host 950, and then crashed. The fragment completion acknowledgement message sent from host 958 to host 950 includes the last-LogRecID for the changes made by engine instance 912 to the primary duplica 932 of slice S2. Thus, after the crash, the coordinating engine instance 902 will have the LogRecID for log record DL3 that was generated by engine instance 912 before the crash.

Unfortunately, with the crash of host 958, the actual log record DL3 will have been lost. After the crash, secondary duplica 938 may be designated to be the new primary duplica of S2. Under these circumstances, the change associated with the log record DL3 will not be reflected in the new primary duplica 938 of S2. During the prepare stage of the commit protocol for transaction TX1, the controlling engine instance 902 will send out prepare messages to all participants in transaction TX1. In the present example, the controlling engine instance 902 will ask host 956 whether it has prepared all changes to slice S2 up to the change reflected in data log record DL3. Because engine instance 908 only has data log records up to DL2, engine instance 908 will report an error during the prepare phase of TX1. Under these circumstances, the entire transaction TX1 may need to be rolled back and re-executed.

The Engine Cluster

The term "engine cluster" is used herein to collectively refer to the set of entities that work together that service database commands from clients. For example, in system 200 illustrated in FIG. 2, the engine cluster includes engine instances 200B-208B. Membership of a engine cluster can change dynamically. For example, if engine instance 202B fails, engine instance 202B ceases to be a member of the engine cluster. Conversely, to increase capacity of a engine cluster, new hosts and engine instances may be added to the engine cluster.

When a change in membership of the engine cluster occurs, duplica hosting responsibilities need to be reassigned. For example, because the duplicas managed by an engine instance on a failed host are no longer accessible, for each primary duplica at the failed host, a secondary duplica at a different host is promoted to primary status. This promotion of secondary duplicas may be performed as part of a transaction failover operation, as described above. Similarly, when new hosts are added to the engine cluster, engine instances at those new hosts need to be assigned to host duplicas in order to distribute some of the system's workload to the new hosts.

The Control Cluster

Figure 12:
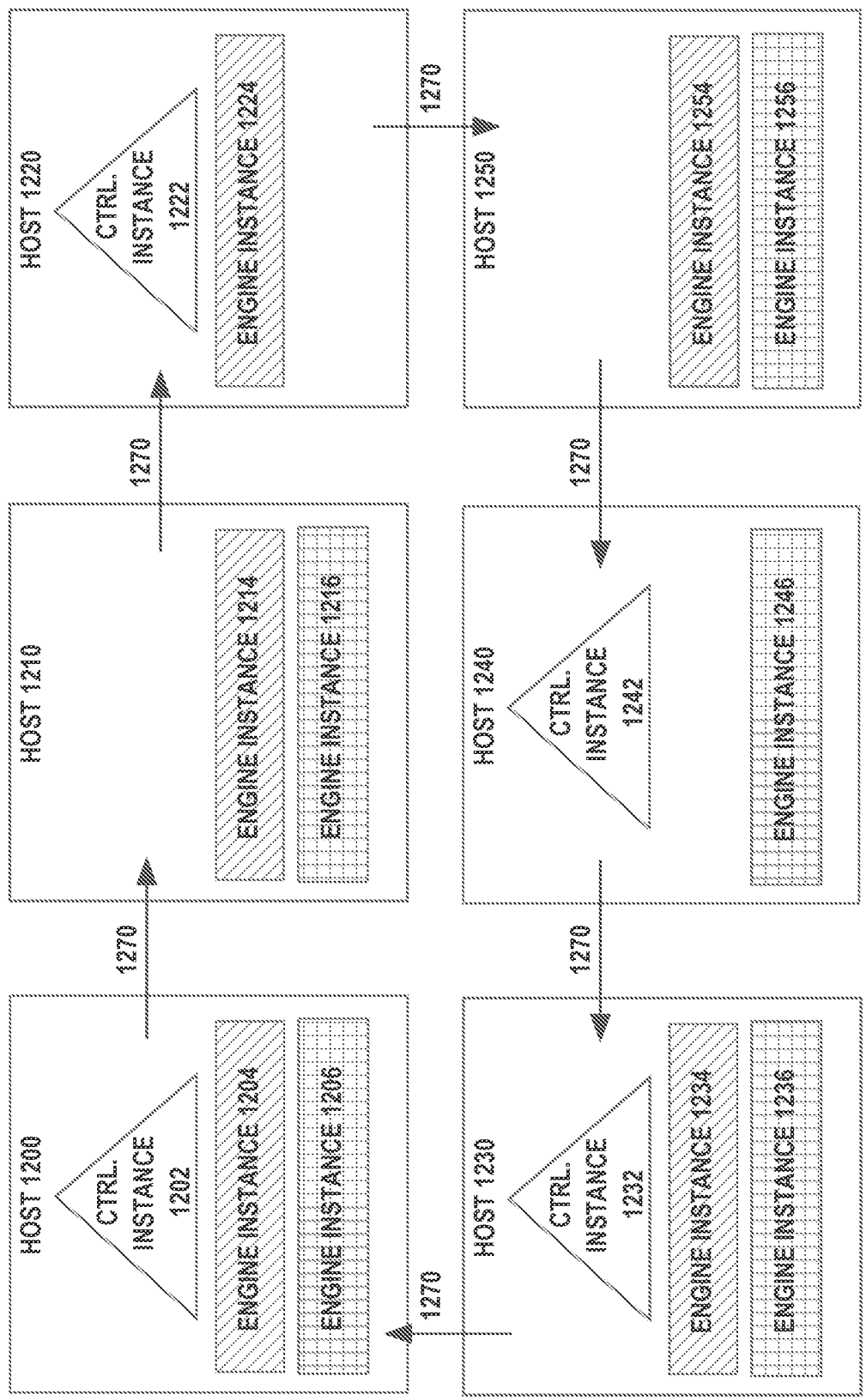
FIG. 12 is a block diagram illustrating a distributed database system with two engine clusters and one control cluster executing on six hosts, according to an embodiment.

According to an embodiment, in addition to the engine cluster, the distributed database system includes a control cluster. A control cluster includes a set of control instances. The number of control instances in a control cluster is often odd, though an even number of control instances can also be used. Referring to FIG. 12, it illustrates a distributed database system that includes six hosts 1200, 1210, 1220, 1230, 1240 and 1250. Two engine clusters and one control cluster are executing on those hosts. Specifically, the control cluster includes control instances 1202, 1222, 1232 and 1242 executing on hosts 1200, 1220, 1230 and 1240, respectively. Engine instances 1204, 1214, 1224, 1234 and 1254, respectively executing on hosts 1200, 1210, 1220, 1230 and 1250 form one engine instance cluster (EC1). Engine instances 1206, 1216, 1236, 1246 and 1256, respectively executing on hosts 1200, 1210, 1230, 1240 and 1250 for another engine instance cluster (EC2).

It is the responsibility of the control cluster to keep track of the current state and membership of each of the engine clusters. Specifically, the control cluster keeps track of which hosts are currently operating as part of the distributed database system, and the neighbor-monitoring relationships between the hosts. Neighbor-monitoring shall be described in greater detail below.

According to one embodiment, the control instances operate as a High-Availability Metadata Infrastructure (HAMI) ensemble. In one embodiment, HAMI provides a hierarchical key-value store over enough machines to be highly available, using only local storage. An ensemble that supports writes typically has 3-9 voting members. There may also be non-voting observers (that can handle client write requests) for additional read scaling. In one embodiment, HAMI improves scalability by directing read-operations to replicas and non-voting observers. A HAMI ensemble is a collection of individual instances of the HAMI engine that are called members. An ensemble is configured with a definite number of members, and in the simple case, a quorum of those configured members must be up and running to provide service. In some embodiments, there may also be a configured number of shared (non-local) storage locations. When there is shared storage, an ensemble can come up with either a quorum of configured members, or when less than a quorum of members that can reach a quorum of the shared storage locations. This allows one configured member to provide service when it can reach enough shared storage, even if the majority of configured members are unavailable. Configured members have fixed network locations and ports. The configuration is kept in the replicated object store visible to all members, and needs nothing beyond name resolution.

In tracking the state and membership of the engine clusters, the control cluster must be able to make very fast decisions about engine cluster membership in response to changes that affect membership. Further, the control cluster itself should be fault tolerant, so that a failure that necessitates a change in an engine cluster's membership does not also cause the control cluster to fail.

The control cluster's view of the host cluster is deemed to be the "truth" for the investigating failures. As shall be described in detail hereafter, investigations are necessary because it is not safe to assume that a host has failed simply because another host has reported that the host has failed. For example, if host 1200 reports that host 1210 has failed, it may be true that host 1210 has failed. However, it may alternatively be true that host 1200 is experiencing network problems (and therefore cannot read the health counters of host 1210), while host 1210 is operating normally. The use of health counters to detect failures shall be described in greater detail hereafter.

Health Counters

Figure 13:
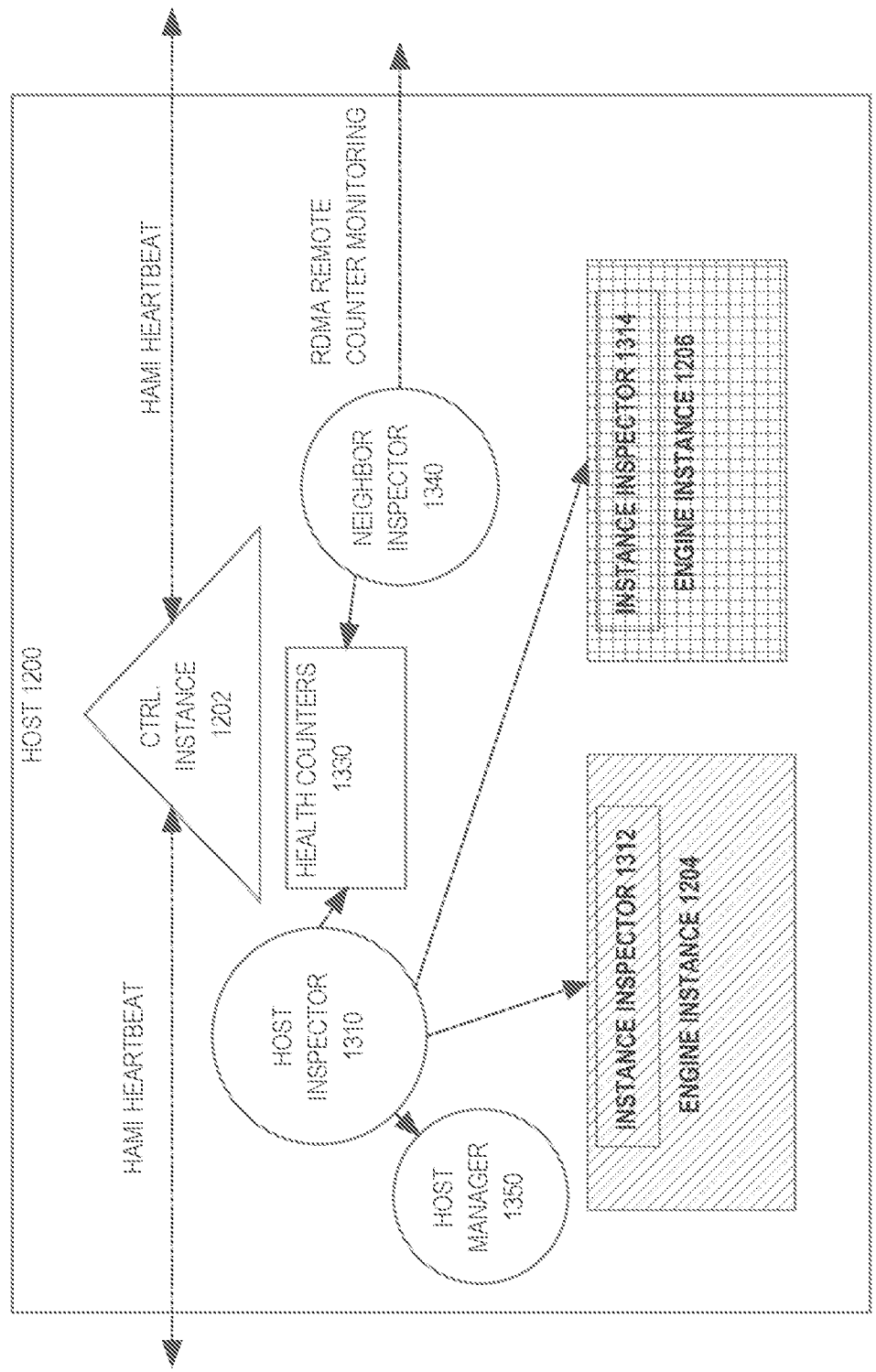
FIG. 13 is a block diagram illustrating a host from FIG. 12 in greater detail.

Referring to FIG. 13, it illustrates host 1200 of FIG. 12 in greater detail. According to one embodiment, each host maintains a set of health counters 1330. Health counters 1330 are values, in the volatile memory of host 1200, that are periodically updated by components within host 1200. When a counter ceases to be updated for more than a threshold period of time, it is likely that the component that is responsible for incrementing the counter has failed. Thus, according to one embodiment, health inspectors monitor the health of their respective components by periodically checking the counters associated with the components to ensure that the counters are incrementing as expected.

Health Inspectors and Monitoring Trees

According to one embodiment, a variety of "health inspectors" are used to monitor the health of the various components of a distributed database system. A health inspector is an entity whose role is to detect when a component has failed. According to one embodiment, the health inspectors are arranged in a hierarchy, where higher-level health inspectors monitor the health of one or more lower-level health inspectors. The hierarchy of health inspectors within a host form a "monitoring tree", where the "root" of the monitoring tree is a health inspector responsible for monitoring the health of the host itself.

In the embodiment illustrated in FIG. 13, engine instances 1204 and 1206 include instance inspectors 1312 and 1314, respectively. In one embodiment, the instance inspectors are the lowest-level health inspectors in the monitoring tree. Instance inspectors monitor scheduler-group-specific health counters that are incremented by scheduler groups executing within their respective engine instances. When the scheduler-group-specific heath counters indicate that the corresponding scheduler groups are executing properly, the instance inspectors increment their own engine-specific health counters.

In addition to instance inspectors 1312 and 1314, host 1200 includes host inspector 1310 and neighbor inspector 1340. Host inspector 1310 monitors the health of the host 1200 based on the engine-specific health counters set by the instance inspectors 1312 and 1314. In addition to monitoring the engine-specific health counters, host inspector 1312 may obtain information from a host manager 1350. Host manager may perform a variety of checks related to the health of host 1200, including but not limited to:
- checking the health of the operating system running on host 1200 (e.g. to check for kernel memory fragmentation)
- checking registers to detect any problems with the host controller adapter (e.g. one or more NICs connected to host 1200)
- checking the health of any SSDs and NVRAM local to host 1200
- checking the health of host services components When the host manager 1350 and the engine-specific heath counters indicate that the engine instances are operating properly, the host inspector 1310 may increment a host-specific health counter.

Neighbor inspector 1340 monitors the health of a neighboring host by periodically reading the value of the host-specific health counter of the neighboring host, as shall be described in greater detail hereafter. In addition to monitoring the host-specific health counter of a neighboring host, neighbor inspector 1340 may periodically read a health counter for the neighbor inspector that is executing on the neighboring host. Thus, neighbor inspector 1340 is able to detect both when its neighboring host is not functioning properly, and when its neighboring host is not properly monitoring its respective neighboring host.

According to one embodiment, neighbor inspector 1340 determines whether a neighboring host is operating properly by reading the health counters from the memory of the neighboring host using RDMA operations. For example, neighbor inspector 1340 may use RDMA operations to read the health counters in the volatile memory of host 1210 (see FIG. 12) to determine whether host 1210 is operating properly.

Finally, within control instance 1202 is logic for detecting the health of other control instances using a HAMI heartbeat. How the health of the control cluster is monitored is described in greater detail hereafter.

Host Monitoring Ring

As mentioned above, a neighbor inspector within each host uses RDMA to read the host-specific heath counters of a neighboring host to determine whether the neighboring host is operating normally. According to one embodiment, the control cluster makes neighbor-monitoring assignments to ensure that the health of every host is being monitored by another host. Such neighboring-monitoring assignments may be made such that the neighbor-monitoring relationships form a ring that includes all hosts.

Referring again to FIG. 12, it illustrates neighbor-monitoring relationships 1270 that form a ring that includes all hosts 1200-1230. In the illustrated embodiment, host 1200 monitors the health of host 1210. Host 1210 monitors the health of host 1220. Host 1220 monitors the health of host 1250. Host 1250 monitors the health of host 1240. Host 1240 monitors the health of host 1230. Host 1230 monitors the health of host 1200.

Network Topology

Figure 16:
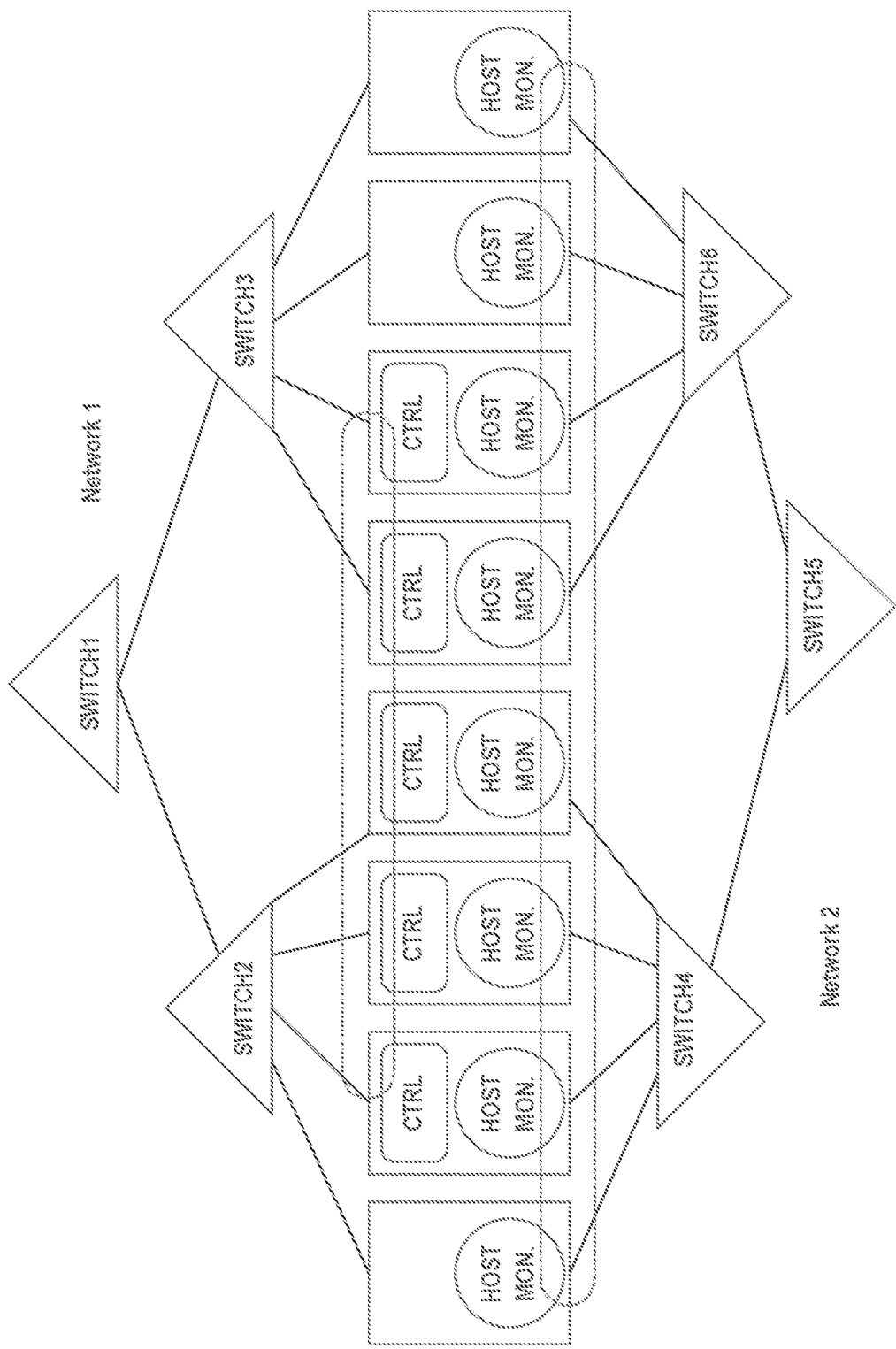
FIG. 16 is a block diagram showing a distributed database system that includes a control cluster where all hosts are able to communicate with each other through two distinct networks, according to an embodiment.

Referring to FIG. 16, it illustrates a network topology to support communications between the entities illustrated in FIG. 12. In FIG. 16, each of eight hosts is executing a host monitor. The host monitors are part of a host monitoring ring, where each host monitors the health of a neighboring host. In addition, some of the hosts are executing control instances.

The topology of the network that connects the hosts is such that each host can connect to each other host through two distinct networks. For example, the host on the far left may communicate with the host on the far right through one network that includes switches 1, 2 and 3, or through a second network that includes switches 4, 5 and 6.

Responding to Engine Instance Failures

When an engine instance fails, the failure will be detected by the host inspector that is running on the same host as the failed engine instance. For example, if engine instance 1204 fails, then instance inspector 1312 will detect the failure and cease to increment the health counter for engine instance 1204. Host inspector 1310 will see that the health counter for engine instance 1204 is not changing, and know that engine instance 1204 has failed.

After the host inspector detects that an engine instance on its host has died, the host inspector sends a message to the surviving engine instances in the engine cluster informing them that a sibling engine instance has died. For example, if there are 100 hosts and there were 10 engine instances in the engine cluster and one engine instance dies, the host inspector would send 9 messages. The engine eviction message tells the other engine instances to evict the failed engine instance from the engine instance cluster. According to one embodiment, the engine eviction messages are sent using RDMA (the fast path), and the host inspector sending the engine eviction messages does not wait for the messages to be acknowledged. These peer-to-peer evict messages are therefore "unreliable".

In addition to sending the engine evict messages to the surviving engine instances, the host inspector that is running on the host of the failed engine instance also sends a message to the control cluster. However, unlike the engine eviction messages sent to the surviving engine instances, after sending the engine eviction message to the control cluster, the host inspector waits for an acknowledgement from the control cluster that the message was received.

Upon receipt of the engine instance eviction message, the control cluster records the engine instance eviction in a control catalog and broadcasts an eviction notification to all surviving members of the engine instance cluster. In contrast to the peer-to-peer evict messages, the evict messages from the control cluster (the slow path) are reliable. Thus, if all inter-host connections are functioning properly, each surviving engine instance will be informed of an engine instance eviction twice: once through RDMA from the host of the failed engine instance, and once through an eviction broadcast from the control cluster.

Upon being informed that an engine instance is to be evicted, the surviving engine instances update their engine instance cluster configuration information to evict the specified engine instance, adjust the slice hosting assignments to account for the removal of the failed engine instance, etc.

Responding to Host Failures

When a host fails, the host assigned to neighbor-monitor that failed host will detect the failure by noticing that the health counters on the failed host are not advancing. For example, assume that the host monitoring ring is established as illustrated in FIG. 12. If host 1210 fails, the failure would be detected by the neighbor inspector on host 1200, which is currently assigned to neighbor-monitor host 1210.

Upon detecting the failure of a host, the host that detected the failure sends a message to the control cluster to report the host failure. After reporting the host failure to the control cluster, the host that detected the failure will begin neighbor-monitoring the host that the failed host was neighbor-monitoring. Thus, upon reporting that host 1210 has failed, host 1200 will commence neighbor-monitoring host 1220 (the host previously monitored by the failed host 1210).

Upon receiving notification of a failed host, the control cluster initiates an investigation. According to one embodiment, the investigation proceeds in a hierarchical fashion.

Figure 14:
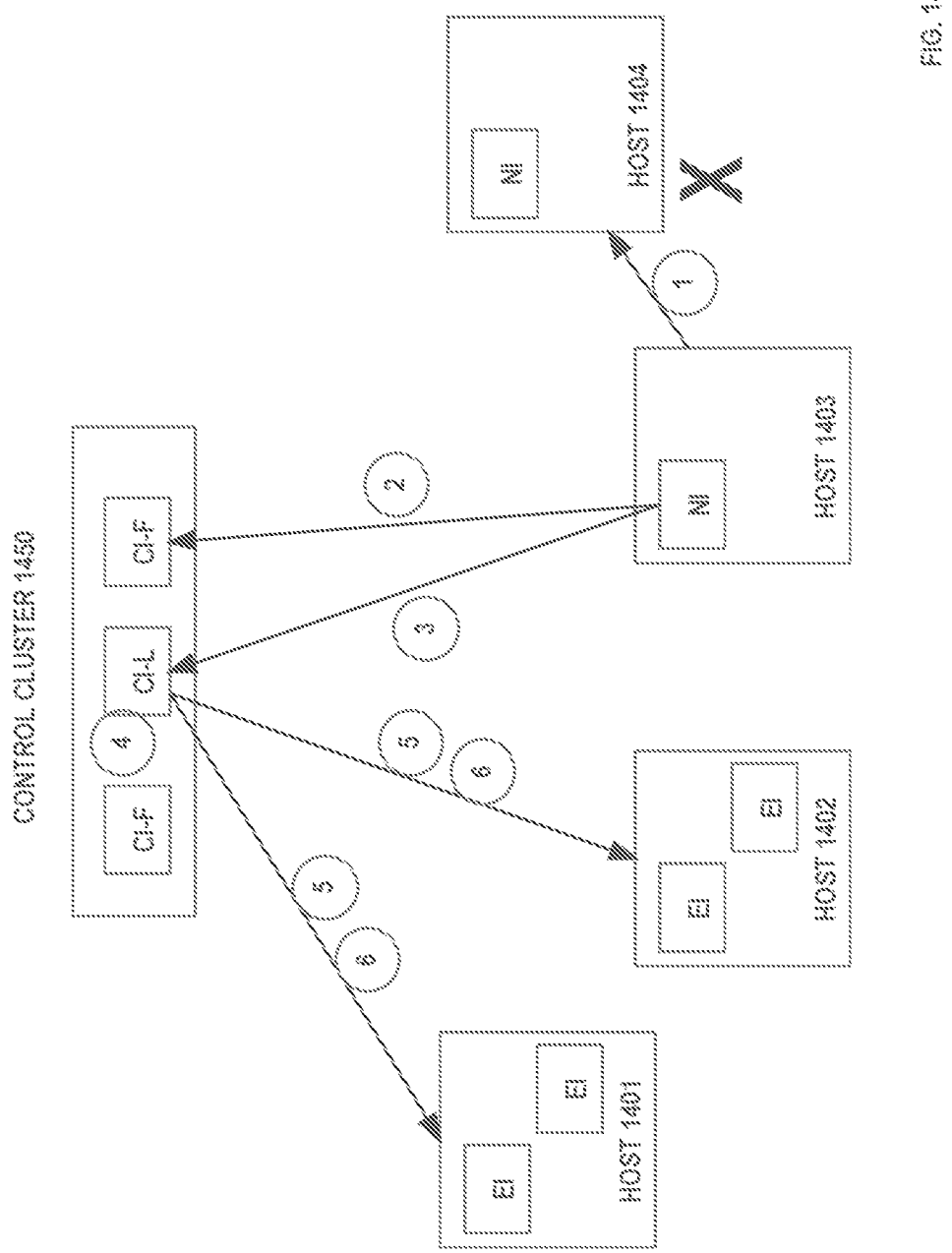
FIG. 14 is a block diagram illustrating messages sent between a control cluster and hosts when a host fails, according to an embodiment.

Referring to FIG. 14, illustrates a distributed database system that includes four hosts 1401, 1402, 1403 and 1404. For the purpose of illustration, it shall be assumed that the neighbor inspector on host 1403 detects a problem with host 1404. The problem may be that the host health counter of host 1404 has ceased to increment, or that host 1403 is unable to communicate with host 1404. Host 1403's attempt to read the health counter of host 1404 is illustrated as (1), indicating that it is chronologically the first action illustrated in FIG. 14.

Upon detecting a problem with host 1404, the neighbor inspector on host 1403 determines who is the current leader in the control cluster 1450. In one embodiment, this may be accomplished using a RDMA of any of the control instances. In the illustrated example, the RDMA of a follower control instance (CI-F) is illustrated as (2).

Once the leader of the control cluster is identified, the neighbor inspector of host 1403 sends a host eviction alert to the control instance leader (CI-L). The transmission of the host eviction alert is illustrated as (3).

In response to receiving a host eviction alert, the control instance leader:
  determines an eviction list (4)
  sends a suspect notification to each of the surviving hosts (5)
  records the eviction list in a control catalog
  updates the state information that corresponds to the hosts that were evicted
  sends an eviction notification to each surviving host (6)

Determining an Eviction List

As explained above with reference to FIG. 14, when one or more hosts have failed, the leader of the control cluster determines which hosts are to be evicted from the host cluster. As a general rule, the leader attempts to keep in the host cluster the largest set of hosts that can communicate with each other. That set is referred to herein as the "largest-fully-connected-set of hosts". The largest-fully-connected-set of hosts is determined based on the connectivity between the hosts, as shall now be described with reference to FIG. 15.

Figure 15:
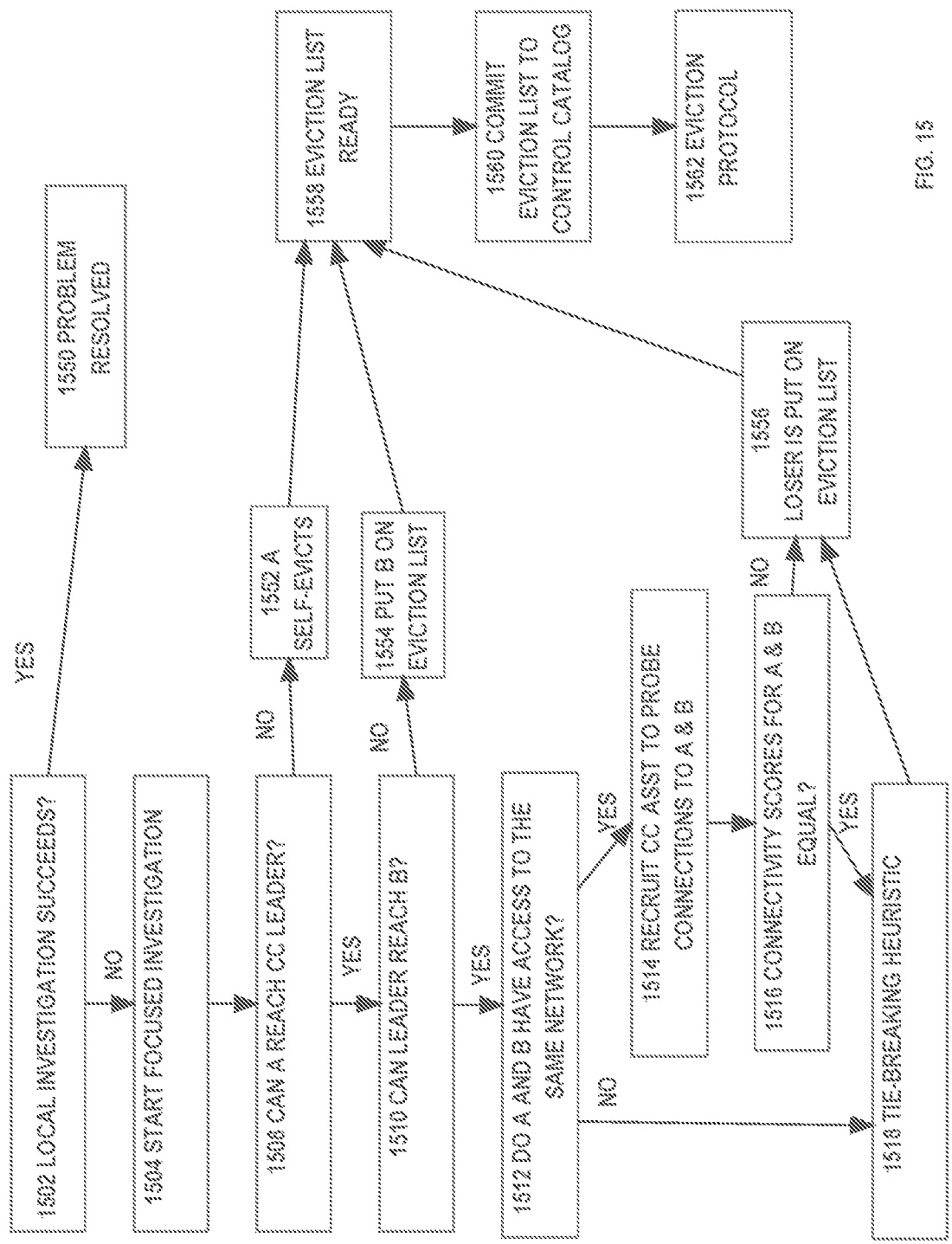
FIG. 15 is a flowchart illustrating steps taken to reconfigure the host cluster when a host fails, according to an embodiment.

Referring to FIG. 15, it is a flowchart for determining the largest-fully-connected-set of hosts, according to one embodiment. At step 1502 it is determined whether the "local investigation" succeeded. The local investigation refers to the troubleshooting steps taken when one engine instance detects a problem with another engine instance with which it is communicating. The end result of Local Investigation is one of these three alternatives:
  Resolution of the problem (e.g. hanging thread restarted)
  Eviction of the instance (as a proxy for Scheduling Group eviction, because we do not have the latter)
  Request to broaden the scope of investigation if connectivity is suspected to be the root cause. In this case we switch mode to Focused Investigation.

The local investigation may involve attempting to restart one or more components, for example. If the local investigation succeeds, then control passes to step 1550 where the problem is considered resolved and normal operation may proceed. If the local investigation fails, then control passes to step 1504.

At step 1504, a "focused investigation" is started. The focused investigation is to determine which engine instances need to be evicted from the host cluster. According to one embodiment, engine instances that do not belong to the largest-fully-connected-set of engine instances are evicted.

For the purpose of illustration, it shall be assumed that the focused investigation was triggered by a situation in which a host A is unable to communicate with a host B. In that scenario, at step 1508, host A determines whether it can reach the current leader of the control cluster. If host A cannot reach the current leader of the control cluster, then host A knows that it will be evicted. Thus, at step 1552, host A self-evicts. After self-eviction, host A ceases to process client requests for data until recovery is performed to add host A back into the host cluster.

If host A can reach the current leader of the control cluster, host A informs the current leader that it is unable to reach host B. At step 1510, the leader of the control cluster attempts to contact host B. If the leader cannot communicate with host B, then at step 1554 host B is added to the eviction list.

If the leader can reach host B, then at step 1512 the leader determines whether hosts A and B have access to the same network. If A and B do not have access to the same network, then control passes to step 1518 and a tie-breaking heuristic is used to determine which of A and B will be evicted. At step 1556, the loser is added to the eviction list.

If hosts A and B have access to the same network, then control passes to step 1514 where one or more other members of the control cluster are used to probe connections to hosts A and B. As a result of the probing performed by the one or more other members of the control cluster, the control cluster determines connectivity scores for hosts A and B. According to one embodiment, the connectivity score for host A reflects how members of the control cluster can communicate with host A, while the connectivity score for host B reflects how many members of the control cluster can communicate with host B.

At step 1516, it is determined whether the connectivity scores of hosts A and B are equal. If the connectivity scores are not equal, then the host with the lower connectivity score is considered the "loser", and is added to the eviction list at step 1556. If the connectivity scores are equal, then a tie-breaking heuristic is used at step 1518 to determine the loser that is put on the eviction list at step 1556.

Steps 1552, 1554 and 1556 are followed by step 1558, where the eviction list is ready. Once ready, the eviction list is committed to the control catalog in step 1560, and at 1562 the eviction protocol is initiated.

Processing evictions is a heavy task for surviving instances. Further, processing evictions must be accomplished in a short time. For example, survivors have to reconfigure slices that are affected by evictions. Survivors may need to build additional duplicas to compensate for lost ones.

As described above, focused investigations are pair-wise. In the case of multiple failures, evictions based on pair-wide investigations might result in unnecessary reconfiguration work. In addition, under multiple failure scenarios, pair-wise investigations can lead to significantly suboptimal global configurations.

To avoid the problems that can result from pair-wise investigations in multiple failure scenarios, a "wide investigation" technique is employed if an alert arrives at the control cluster during a focused investigation (or very soon thereafter). Receiving such an alert during a focused investigation may be indicative of a multiple-failure scenario.

During a "wide investigation", the control cluster serves as the investigator and the arbiter, and all hosts of the cluster are within the scope of investigation. During the wide investigation, the connections between the control cluster and hosts are checked, rather than checking the full set of peer-to-peer connections between hosts. Evictions resulting from a wide investigation are batched in a single eviction list.

In a wide investigation, the network connections available to the control cluster leader are classified. For example, assume that the control cluster leader is connected to two networks (network 1 and network 2). Hosts to which the control cluster leader has access through both network 1 and network 2 can be categorized as "fully connected hosts". Hosts to which the control cluster leader has indirect access through a single network can be categorized as "fringe hosts". Host to which the control cluster leader has no access, direct or indirect, are categorized as "unreachable". After the categorization, the unreachable hosts are evicted.

The fringe hosts of one network generally cannot communicate with the fringe hosts of another network. Under these circumstances, the control cluster leader decides which network's fringe hosts to evict. For example, the control cluster leader may decide that the fringe hosts in network 1 remain, while the fringe hosts in network 2 are evicted. According to one embodiment, when selecting which network's fringe hosts to retain, the control cluster leader favor retaining hosts that include control instances over hosts that do not include control instances. If the wide investigation was initially triggered by an alert from one host about another, the control cluster instance ensures that at least one of those two hosts is included in the proposed eviction list.

Responding to Other Types of Failures

Host and engine instance failures are not the only type of failure that can occur within the distributed database system. For example, software components, such as a host service (e.g. host inspector 1310) and instance service (e.g. engine instance 1204 or control instance 1202) may fail. When a software component fails, the system automatically attempts to restart the failed component.

If an engine instance dies (fails and cannot be restarted), the host inspector for the engine instance, which is executing on the same host as the engine instance, detects the failure and reports the failure to the control cluster. For example, if engine instance 1204 dies, host inspector 1310 reports to the control cluster that engine instance 1204 is dead. Reporting a dead engine instance in this manner is referred to as "unilateral reporting" since it does not involve a component on any host other than the host on which the failed engine instance was executing. In response to being informed that an engine instance has failed, the control cluster reconfigures the engine cluster in a manner that evicts the failed engine instance.

Engine Instance Eviction

An engine instance may need to be evicted from the engine cluster for a variety of reasons. For example, as explained above, the engine instance may need to be evicted because an instance inspector had detected that the engine instance has ceased doing useful work. An engine instance will also need to be evicted if the host on which the engine instance is executing fails (which may be detected through neighbor monitoring). Finally, an engine instance will need to be evicted if the host on which the engine instance is executing loses connection to the other hosts in the host cluster (e.g. because of a link or switch failure).

Evicting an engine instance involves reconfiguring the engine cluster in a manner that excludes the engine instance. Reconfiguring the engine cluster may involve:

determining the primary duplicas that were managed by the evicted engine instance designating secondary duplicas of those primary duplicas as new primary duplicas creating new secondary duplicas to take the place of those secondary duplicas that were turned into primary duplicas updating the slice-to-engine-instance mapping to reflect the changes Control Instance Health Monitoring By monitoring neighboring hosts in a host monitoring ring, as described above, it is possible to detect when a host fails. In one embodiment, a separate health monitoring mechanism is used to detect failure of control instances. Specifically, according to an embodiment, the control cluster uses a RAFT protocol to detect failures among its members. RAFT protocols are described in detail in "In Search of an Understandable Consensus Algorithm", by Diego Ongaro and John Ousterhout, Standford University, which can be found at www.usenix.org/conference/atc14/technical-sessions/presentation/ongaro, the content of which is incorporated herein by reference.

According to the RAFT protocol, at any given time there is a control instance that is designated the "leader instance". However, the leader instance designation is temporary, and changes over time. In one embodiment, the leadership periods are of fixed duration. Once the leadership duration has elapsed with one leader, the leadership designation automatically passes to another leader. According to an embodiment, the sequence of leadership designation forms a ring that includes all control instances in the control cluster. Thus, each control instance has an equal "turn" at being the designated leader instance. In an alternative embodiment, leadership does not automatically change over time. Rather, once chosen as the leader, a control instance remains leader until it fails, at which time a follower may be elected as the new leader. In one embodiment, when a new leader is chosen, each control instance has the same chance of being chosen as the new leader.

In one embodiment, to detect control instance failure, the leader instance sends heartbeat messages to all other control instances, and all other control instances send heartbeat messages back to the leader instance. Failure to receive a heartbeat message within a threshold period of time indicates that the control instance from which the heartbeat was not received is not operating correctly. Thus, the leader instance is able to detect when any other control instance (the "follower instances") fails, and all follower instances are able to detect when the leader instance fails.

In an alternative embodiment, the control cluster may use health counters and RDMA to detect failures in a manner similar to the host cluster. Specifically, rather than the leader instance sending heartbeat messages to all follower instances, the leader instance may increment a health counter and the follower instances may check the leader instance's health counter using RDMA. Similarly, rather than the follower instances sending heartbeat messages to the leader instance, the follower instances may update local health counters and the leader instance may use RDMA to check that the respective health counters of the follower instances are advancing.

According to one embodiment, every control instance has an instance inspector that monitors the health of the control instance. The host inspector reads the health counters updated by the control instance's inspector. If the control instance inspector detects a failure within the control instance, or if the control instance terminates, then the health counters are not updated. This is detected by the host inspector, which sends an alert to the remaining members of the control cluster to indicate one of the members of the control cluster is dead. The remaining members may initiate an election if the dead member was the known to the last leader. This ensures that a leadership election is started quickly.

Handling Control Instance Failure

If a control instance misses a heartbeat from the leader instance, then a HAMI election is initiated to determine a new leader. In contrast, when a HAMI follower stops responding to the HAMI leader's requests, the HAMI follower continues to be treated as part of the HAMI ensemble.

When an update request is received by the HAMI leader, the following events occur:
  the leader attempts to persist the request on a quorum of the members (including itself)
  once the quorum is achieved, the update request commits, even if a follower is not responding
  the leader will continue to ship log records, asynchronously, to any non-responding follower Asynchronous requests sent to non-responding followers will not have any impact on the latency of update requests as long as a quorum can be achieved.

Whenever a follower that has been removed from the ensemble is able to join the ensemble again (after a restart or network partition repair, etc.), the follower will start receiving the log records (or a snapshot of the log records) to catch up. In addition, control instances can be added to or removed from the control cluster through an administrative action.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
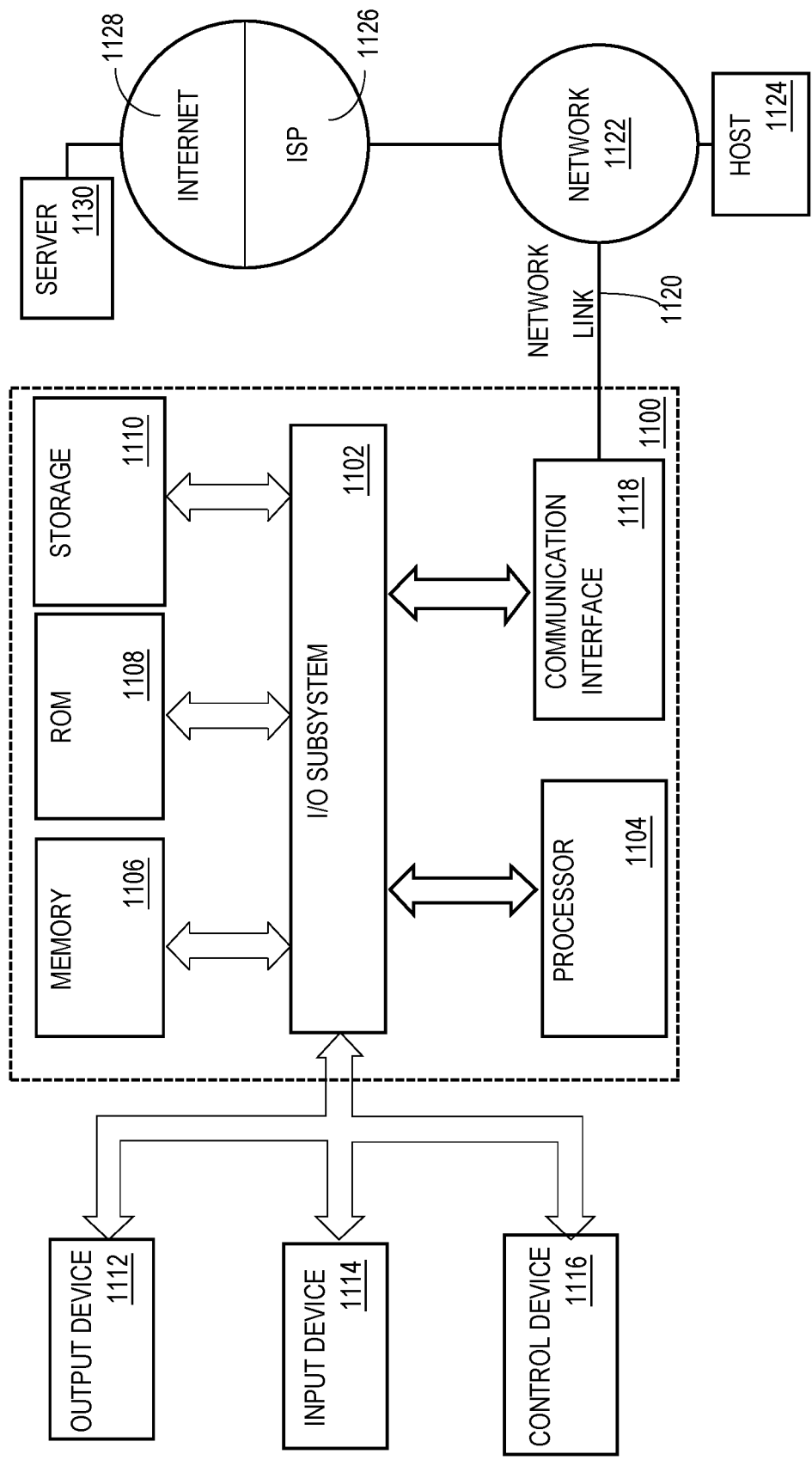
FIG. 11 is a block diagram of a computer system that may be used as a client or host in a distributed database system that employs the techniques described herein.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    on each host of a plurality of hosts, executing one or more engine instances of a plurality of engine instances to form an engine cluster, wherein each host of the plurality of hosts is a computing device;
    establishing neighbor relationships among the plurality of hosts;
    executing a plurality of control instances on a first set of hosts of the plurality of hosts to form a control cluster, wherein:
        each control instance executes on a distinct host of the first set of hosts,
        the plurality of control instances maintain data indicating the neighbor relationships between the plurality of hosts, and
        the plurality of control instances comprise a control instance leader and one or more control instance followers;
    in response to a first host within the plurality of hosts indicating a failure of a neighbor host, initiating a pair-wise focused investigation to check peer-to-peer connections between the first host and the neighbor host;
    in response to one or more additional hosts within the plurality of hosts indicating failures of neighbor hosts while the pair-wise focused investigation is being performed, performing a wide investigation to check connections between the control cluster and the plurality of hosts;
    adding one or more hosts to an eviction list based on results of the pair-wise focused investigation or the wide investigation; and
    performing an eviction protocol to evict the one or more hosts from the engine cluster using the eviction list.

2. The method of claim 1, wherein the pair-wise focused investigation comprises:
    determining whether the first host can reach the control instance leader; and
    in response to a determination that the first host cannot reach the control instance leader, adding the first host to the eviction list.

3. The method of claim 2, wherein the first host ceases to process client requests for data until recovery is performed to add the first host back into the engine cluster.

4. The method of claim 2, wherein the pair-wise focused investigation comprises:
    in response to a determination that the first host can reach the control instance leader, attempting contact, by the control instance leader, with the neighbor host; and
    in response to a determination that the control instance leader cannot communicate with the neighbor host, adding the neighbor host to the eviction list.

5. The method of claim 4, wherein the pair-wise focused investigation comprises:
    in response to a determination that the control instance leader can communicate with the neighbor host, determining whether the first host and the neighbor host have access to the same network;
    in response to a determination that the first host and the neighbor host do not have access to the same network, using a tie-breaking heuristic to determine which of the first host and the neighbor host is to be evicted; and
    adding the first host or the neighbor host to the eviction list based on results of the tie-breaking heuristic.

6. The method of claim 5, wherein the pair-wise focused investigation comprises:
    in response to a determination that the first host and the neighbor host have access to the same network, performing, by at least one control instance follower from the one or more control instance followers, a probing operation on the first host and the neighbor host;
    determining a connectivity score for each of the first host and the neighbor host based on results of the probing operation; and
    adding the first host or the neighbor host to the eviction list based the connectivity scores of the first host and the neighbor host.

7. The method of claim 6, wherein the connectivity score is based on a number of members of the control cluster can communicate with the first host or the neighbor host.

8. The method of claim 6, wherein the pair-wise focused investigation comprises:
    in response to a determination that the connectivity score of the first host and the connectivity score of the neighbor host are not equal, adding the first host or the neighbor host having a lower connectivity score to the eviction list; and
    in response to a determination that the connectivity score of the first host and the connectivity score of the neighbor host are equal, using the tie-breaking heuristic to determine which of the first host and the neighbor host is to be evicted; and
    adding the first host or the neighbor host to the eviction list based on results of the tie-breaking heuristic.

9. The method of claim 1, wherein the wide investigation comprises:
    classifying connections between the control instance leader and each host of the plurality of hosts; and
    adding a subset of the plurality of hosts to the eviction list based on results of classifying.

10. The method of claim 9, wherein evictions of the subset of the plurality of hosts are batched.

11. The method of claim 9, wherein classifying the connections between the control instance leader and each host of the plurality of hosts comprises classifying hosts that are unreachable into a subset of unreachable hosts, wherein the subset of the plurality of hosts includes the subset of unreachable hosts.

12. The method of claim 9, wherein classifying the connections between the control instance leader and each host of the plurality of hosts comprises:
    classifying one or more hosts to which the control instance leader has indirect access through a single network within a plurality of networks as a subset of fringe hosts;
    identifying, by the control instance leader, at least one host within the subset of fringe hosts to be evicted; and
    adding the identified at least one host to the eviction list.

13. The method of claim 12, wherein identifying the at least one host within the subset of fringe hosts to be evicted comprises identifying at least one host that does not include a control instance.

14. The method of claim 12, wherein:
the first set of hosts in the control cluster are connected using a first network,
the plurality of hosts in the engine cluster are connected using a second network, and
identifying the at least one host within the subset of fringe hosts to be evicted comprises identifying at least one host connected to the control instance leader using the first network.

15. The method of claim 14, wherein classifying the connections between the control instance leader and each host of the plurality of hosts comprises classifying at least one host connected to the control instance leader using the first network and the second network as a subset of fully connected hosts.

16. One or more non-transitory storage media storing instructions which, when executed by one or more computing devices, cause performance of a method comprising:
on each host of a plurality of hosts, executing one or more engine instances of a plurality of engine instances to form an engine cluster, wherein each host of the plurality of hosts is a computing device;
establishing neighbor relationships among the plurality of hosts;
executing a plurality of control instances on a first set of hosts of the plurality of hosts to form a control cluster, wherein:
each control instance executes on a distinct host of the first set of hosts,
the plurality of control instances maintain data indicating the neighbor relationships between the plurality of hosts, and
the plurality of control instances comprise a control instance leader and one or more control instance followers;
in response to a first host within the plurality of hosts indicating a failure of a neighbor host, initiating a pair-wise focused investigation to check peer-to-peer connections between the first host and the neighbor host;
in response to one or more additional hosts within the plurality of hosts indicating failures of neighbor hosts while the pair-wise focused investigation is being performed, performing a wide investigation to check connections between the control cluster and the plurality of hosts;
adding one or more hosts to an eviction list based on results of the pair-wise focused investigation or the wide investigation; and
performing an eviction protocol to evict the one or more hosts from the engine cluster using the eviction list.

17. The one or more non-transitory storage media of claim 16, wherein the wide investigation comprises:
classifying connections between the control instance leader and each host of the plurality of hosts; and
adding a subset of the plurality of hosts to the eviction list based on results of classifying.

18. The one or more non-transitory storage media of claim 17, wherein classifying the connections between the control instance leader and each host of the plurality of hosts comprises classifying hosts that are unreachable into a subset of unreachable hosts, wherein the subset of the plurality of hosts includes the subset of unreachable hosts.

19. The one or more non-transitory storage media of claim 17, wherein classifying the connections between the control instance leader and each host of the plurality of hosts comprises:
classifying one or more hosts to which the control instance leader has indirect access through a single network within a plurality of networks as a subset of fringe hosts;
identifying, by the control instance leader, at least one host within the subset of fringe hosts to be evicted; and
adding the identified at least one host to the eviction list.

20. The one or more non-transitory storage media of claim 19, wherein:
the first set of hosts in the control cluster are connected using a first network,
the plurality of hosts in the engine cluster are connected using a second network, and
identifying the at least one host within the subset of fringe hosts to be evicted comprises identifying at least one host connected to the control instance leader using the first network.

* * * * *